United States Patent [19]
Souda et al.

[11] Patent Number: 5,493,440
[45] Date of Patent: *Feb. 20, 1996

[54] OPTICAL ISOLATOR AND OPTICAL FIBER AMPLIFIER

[75] Inventors: Hironori Souda, Osaka; Masaaki Tojo; Noboru Kurata, both of Nara; Masanori Iida, Osaka, all of Japan

[73] Assignee: Matsushita Electric Industrial Co., Ltd., Osaka, Japan

[ * ] Notice: The portion of the term of this patent shall not extend beyond the expiration dat of Pat. No. 5,299,056.

[21] Appl. No.: 324,972

[22] Filed: Oct. 18, 1994

[30] Foreign Application Priority Data

Oct. 19, 1993 [JP] Japan .................................. 5-260511
Mar. 9, 1994 [JP] Japan .................................. 6-038360

[51] Int. Cl.$^6$ ........................................................ G11B 7/00
[52] U.S. Cl. ........................... 359/341; 359/629; 359/639
[58] Field of Search ................................... 359/618–629, 359/638, 639, 640, 341

[56] References Cited

U.S. PATENT DOCUMENTS

| | | | |
|---|---|---|---|
| 5,191,467 | 3/1993 | Kapany et al. | 359/341 |
| 5,299,056 | 3/1994 | Kurata et al. | 359/341 |
| 5,355,249 | 10/1994 | Souda et al. | 359/341 |

FOREIGN PATENT DOCUMENTS

4-190333 7/1992 Japan .
6-118235 4/1994 Japan .

OTHER PUBLICATIONS

U.S. patent application Ser. No. 08/059,762, filed on May 12, 1993, Kurata et al.

*Primary Examiner*—Mark Hellner
*Attorney, Agent, or Firm*—Willian Brinks Hofer Gilson & Lione

[57] ABSTRACT

On one end side of a converging rod lens are provided a first and second input optical fibers and a first and second output optical fibers. On the other end side of the converging rod lens is provided a reflecting mirror. Between the converging lens and the first and second input and output optical fibers is provided a birefringent element for resolving a ray which passes therethrough into an ordinary ray and an extraordinary ray. In the optical paths of the first and second output optical fibers between the converging rod lens and birefringent element is placed a compensator for rotating 45 degrees the plane of polarization of a ray which passes therethrough. The reflecting mirror reflects incident rays from the first and second input optical fibers to the first and second output optical fibers. Between the converging rod lens and the reflecting mirror is provided a magneto-optical element for rotating 22.5 degrees the plane of polarization of a ray which passes therethrough. The rays emitted from the first and second input optical fibers have their planes of polarization rotated 90 degrees by the magneto-optical element and compensator.

25 Claims, 25 Drawing Sheets

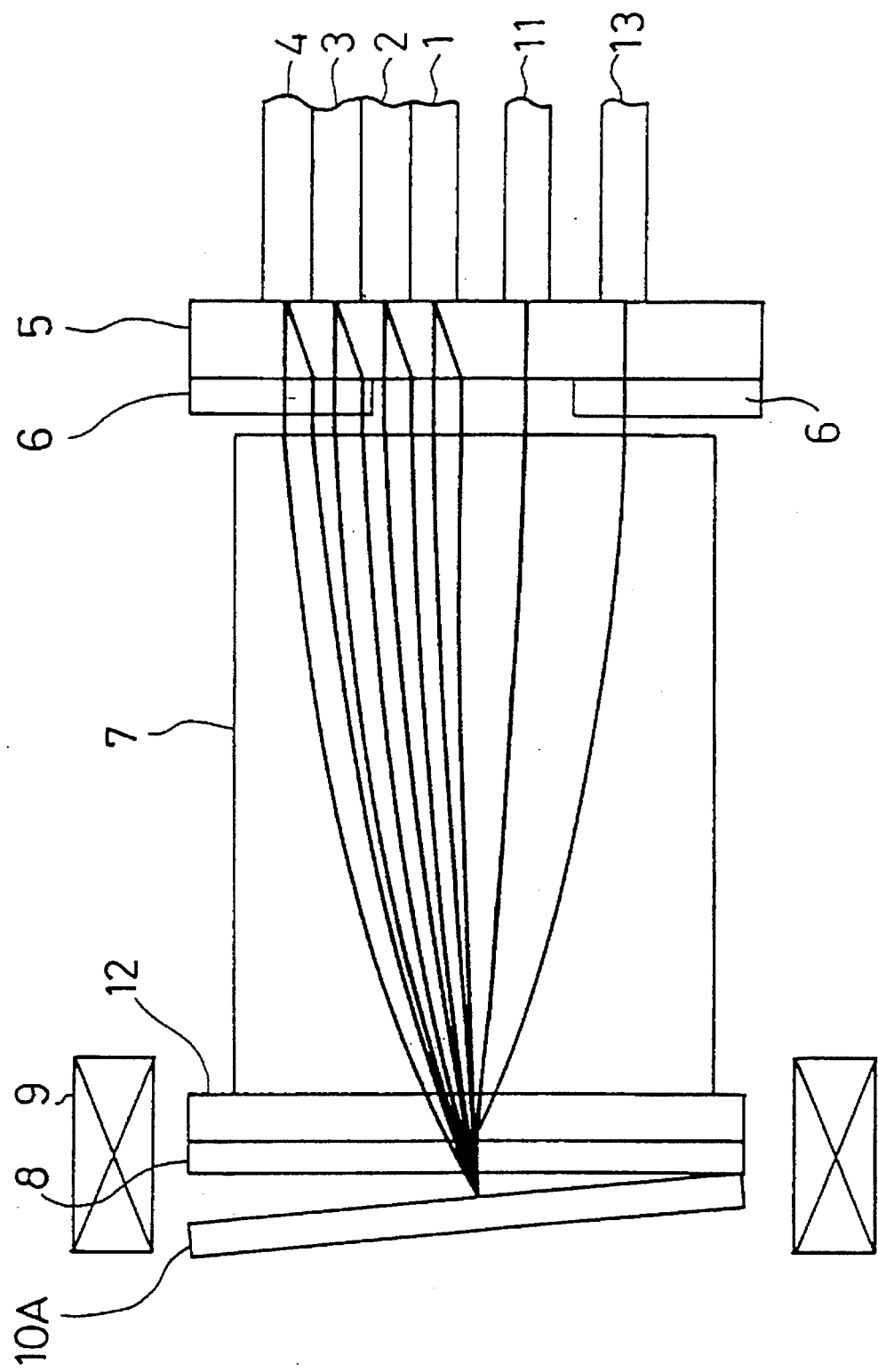

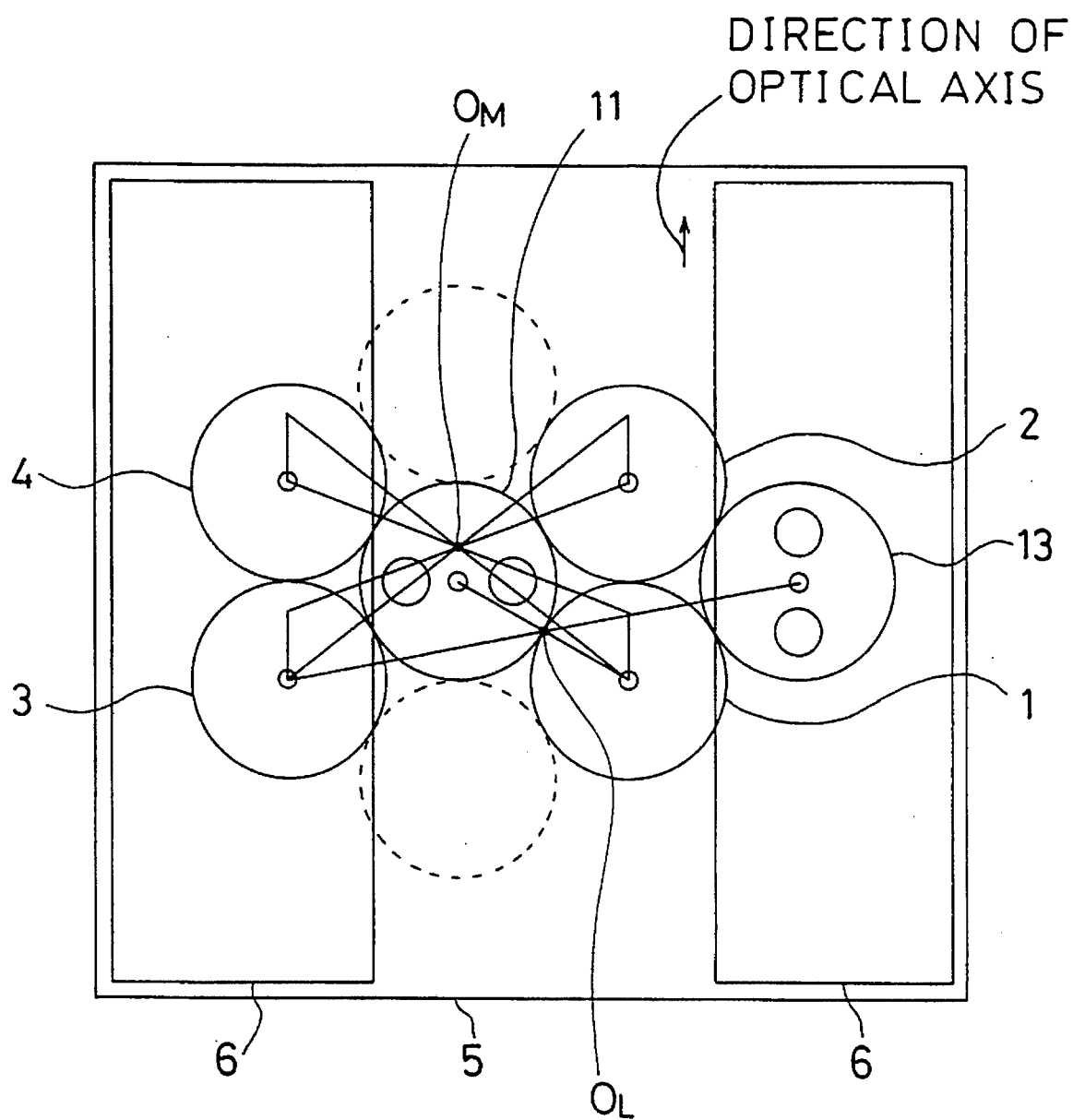

Fig. 19(a)(1)
Fig. 19(a)(2) OPTICAL AXIS OF LENS
SURFACE OF REFLECTING MIRROR
ROTATION CENTER OF REFLECTING MIRROR
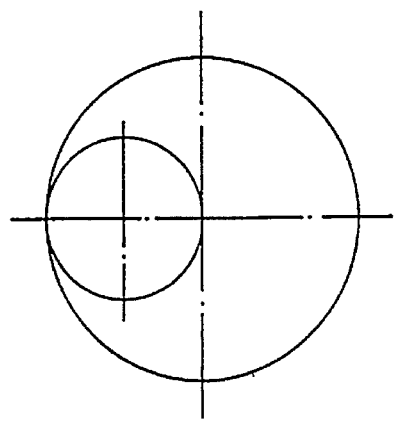
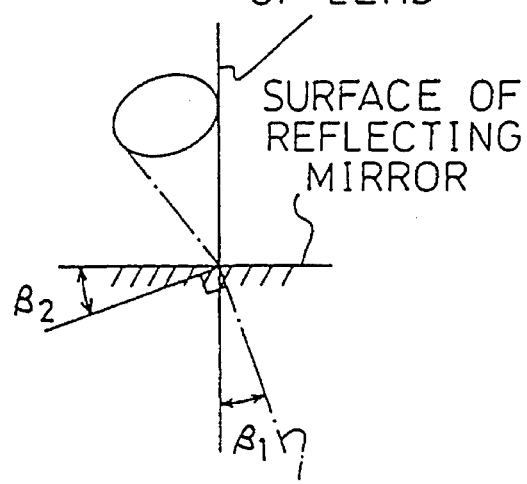
Fig. 19(b)(1)
Fig. 19(b)(2)
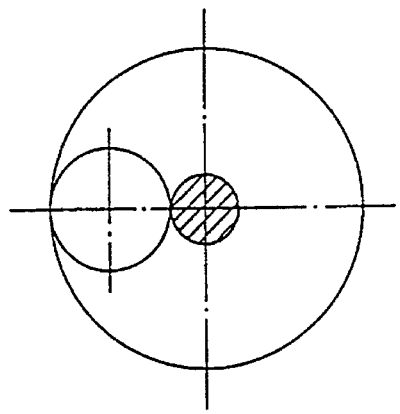
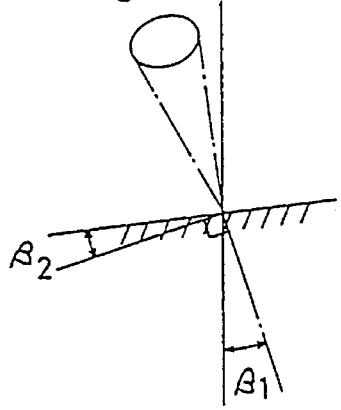
Fig. 19(c)(1)
Fig. 19(c)(2)
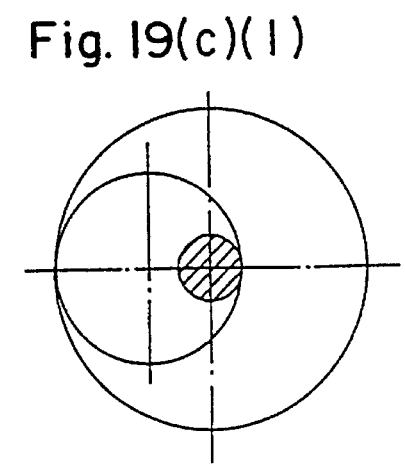
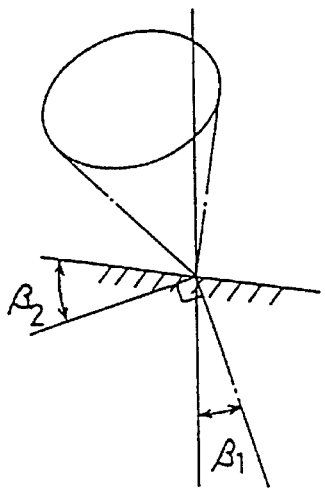

◁ : M₁ MARKING ON HOLDING MEMBER
▶ : M₂ MARKING ON HOLDING MEMBER

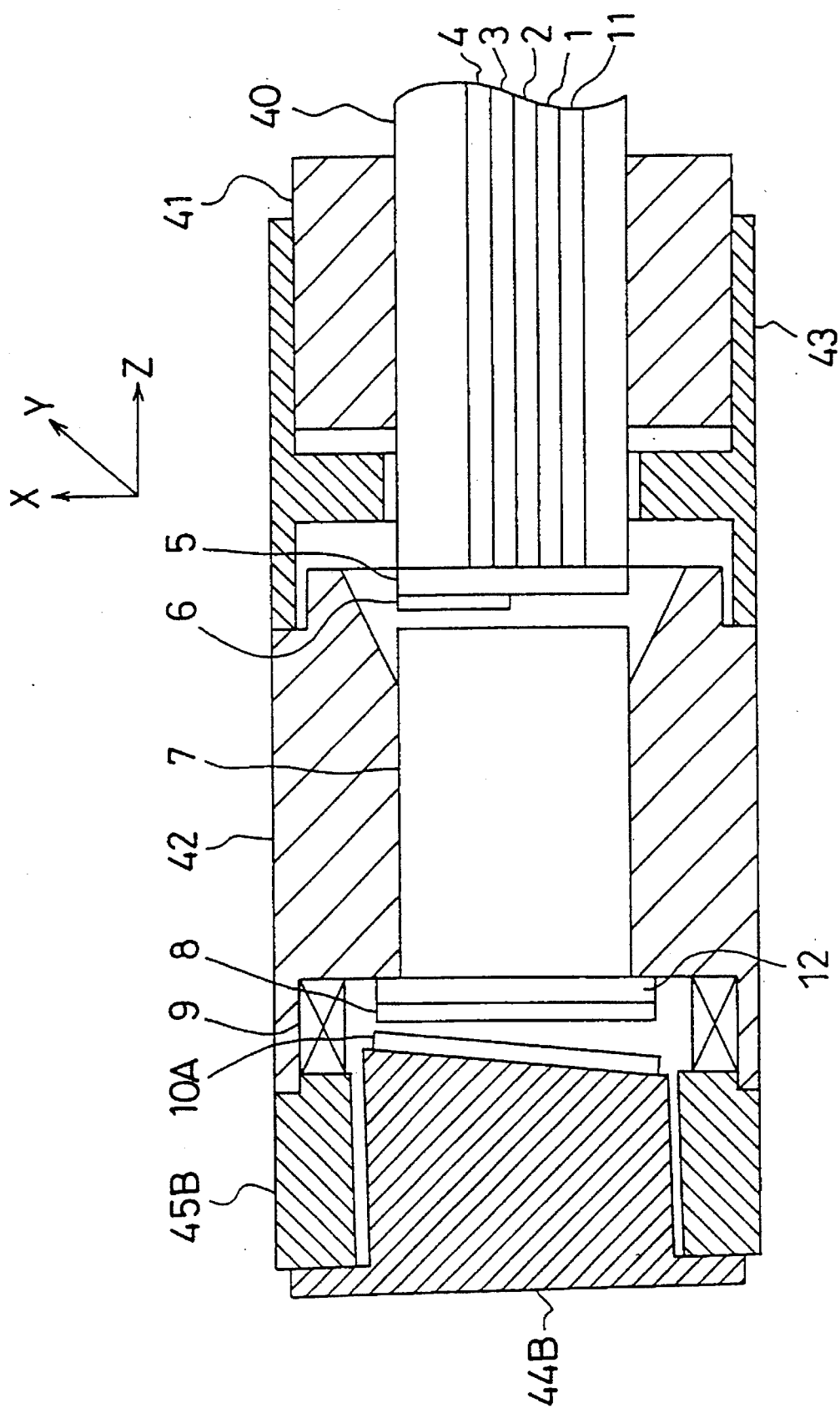

OPTICAL ISOLATOR AND OPTICAL FIBER AMPLIFIER

BACKGROUND OF THE INVENTION

The present invention relates to an optical isolator independent of polarization and to an optical fiber amplifier using the optical isolator.

An optical fiber amplifier is for amplifying signal light by utilizing stimulated emission caused by a population inversion in a laser medium in an optical fiber. A commonly used laser medium is an erbium-doped optical fiber (EDF) produced by adding erbium (Er), which is one of rare earth elements, to the core of a quartz-type optical fiber. The amplification of signal light is achieved by injecting intense excitation light as well as the signal light into the EDF. Excitation systems whereby excitation light is injected into the EDF include: a forward excitation system whereby excitation light is made incident from the same direction as the propagation of signal light; a backward excitation system whereby excitation light is made incident from the direction opposite to the propagation of signal light, and a bidirectional excitation system whereby excitation light is made incident from both directions. The forward excitation system is effective in reducing the noise figure (NF), while the backward excitation system is effective in obtaining a high-power output. The bidirectional excitation system has the advantage of the forward excitation system and the advantage of the backward excitation system in combination. These excitation systems are selectively used depending on characteristics required, such as amplification output, input optical power, gain, and NF.

The basic optical fiber amplifier is composed of an EDF, an excitation light source, an optical multiplexer, and an optical isolator independent of polarization (hereinafter referred to as an optical isolator). The optical isolator, which is for preventing the oscillation of the optical fiber amplifier, is generally connected to each end of the EDF.

Conventionally, there has been proposed an optical fiber amplifier in which a single optical isolator is connected to both ends of an EDF so as to perform a function comparable to the function of the two optical isolators (Japanese Laid-Open Patent No. 4-190333 or 6-118235).

However, the conventional optical isolator is disadvantageous in that a larger mounting area is required for intricate installation of optical fibers, since an input optical fiber and an output optical fiber are connected on both sides of the main body of the optical isolator.

Moreover, since the input optical fiber and output optical Fiber are connected on both sides of the main body of the optical isolator, it is necessary to adjust the optical axes of the input optical fiber and output optical fiber individually, resulting in a larger number of points at which the optical axes should be adjusted.

Furthermore, if the function of monitoring a part of signal Light and an optical multiplexing function are to be imparted the conventional optical isolator, the structure thereof becomes complicated as well as the parts thereof increase in size.

SUMMARY OF THE INVENTION

The present invention has been achieved in view of the foregoing. It is therefore an object of the present invention to provide a miniaturized low-loss optical isolator of simple structure in which the optical axes of input and output optical fibers can be adjusted easily and a reduced number of optical parts are provided and to provide an optical fiber amplifier using such an optical isolator.

An optical isolator according to the present invention comprises: a lens for converting incident light into collimated light; a plurality of pairs of input optical fibers and output optical fibers provided on one end side of said lens; a reflecting mirror provided on the other end side of said lens so as to reflect incident rays from said input optical fibers, which passed through said lens, to said output optical fibers which correspond individually to said input optical fibers; a birefringent element provided between said lens and said input and output optical fibers so as to resolve light which passes therethrough into an ordinary ray and an extraordinary ray, which are linearly polarized rays at right angles to each other; a compensator provided in the optical paths of the incident rays from said input optical fibers between said lens and said birefringent element or in the optical paths of the rays emitted to said output optical fibers so as to rotate 45 degrees the planes of polarization of the rays which pass therethrough; and a magneto-optical element provided between said lens and said reflecting mirror so as to rotate 22.5 degrees the planes of polarization of the rays which pass therethrough, said compensator and said magneto-optical element rotating the planes of polarization of the rays emitted from said input optical fibers in the same direction.

With the above optical isolator, the incident light in the forward direction from the input optical fibers is resolved by the birefringent element into the ordinary ray and extraordinary ray, so that their planes of polarization are rotated 22.5 degrees by the magneto-optical element. The rays the forward direction, which have been rotated by the reflecting mirror, have their planes of polarization rotated 22.5 degrees more by passing through the magneto-optical element again and have their planes of polarization rotated 45 degrees more by the compensator. As a result, the planes of polarization of the rays in the forward direction, when they pass through the birefringent element on a return trip, have been rotated 90 degrees in all since they passed through the birefringent element in an outward trip. The ordinary ray, which passed through the birefringent element in an outward trip, is made incident upon the birefringent element as an extraordinary ray on a return trip, while the extraordinary ray, which passed through the birefringent element in an outward trip, is made incident upon the birefringent element as an ordinary ray on a return trip. Consequently, the extraordinary ray and ordinary ray which passed through the birefringent element on a return trip are combined so as to be coupled to the output optical fiber.

On the other hand, the incident light in the reverse direction fir ore each output optical fiber is resolved by the birefringent element into the ordinary ray and extraordinary ray, so that they are rotated 45 degrees by the compensator. Since the rays transmitted by the magneto-optical element has their planes of polarization rotated in the same direction irrespective of the direction in which they are advancing, the rays in the reverse direction, which had their planes of polarization rotated by the compensator, have their planes of polarization rotated 22.5 degrees in the direction opposite to their rotation by the compensator by passing through the magneto-optical element. Consequently, the planes of polarization of the rays in the reverse direction, which passed through the magneto-optical element twice in a round trip to be incident upon the birefringent element, are coincident with the planes of polarization of the rays which are emitted from the birefringent element on an outward trip. Accordingly, the rays in the reverse direction which passed through the magneto-optical element on a return trip are not coupled to the input optical fiber, so that tile isolating function is performed.

As a result, it becomes possible to reduce the number of optical parts and to provide a miniaturized apparatus at lower cost, for the provision of a single lens and a single birefringent element is sufficient irrespective of the pairs of input optical fibers and output optical fibers being provided. Moreover, since the pairs of input optical fibers and output optical fibers can be formed into an array, it becomes possible to adjust the optical axis of each optical fiber and that of the lens at a time, so that assembly time can be reduced and intricate installation of the optical fibers becomes no more necessary.

Consequently, there can be implemented a miniaturized low-loss optical isolator of simple structure provided with fewer optical parts in which the optical axes of the input and output optical fibers can be adjusted easily.

In the above optical isolator, it is preferable that a connecting line segment between the input optical fiber and output optical fiber in one of said pairs and a connecting line segment between the input optical fiber and output optical fiber in the other of said pairs intersect each other at midpoints.

As a result, the input optical fiber and output optical fiber in one pair and the input optical fiber and output optical fiber in the other pair become symmetric with respect to the intersection of the above two line segments. Consequently, the incident light from the input optical fiber in one pair is surely coupled to the output optical fiber in one pair, while the incident light from the input optical fiber the other pair is surely coupled to the output optical fiber in the other pair.

In the above optical isolator further comprising three more optical fibers which are aligned on one end side of said lens, it is preferable that said input optical fibers and output optical fibers are two pairs of input optical fibers and output optical fibers and said two pairs of input optical fibers and output optical fibers are arranged so that each input optical fiber and its corresponding optical fiber are diagonally positioned with said three optical fibers interposed therebetween and that said two pairs of input optical fibers and output optical fibers and said three optical fibers are stacked so as to form a hexagon in cross section.

With the arrangement, the connecting line segment between the input optical fiber and output optical fiber in one pair and the connecting line segment between the input optical fiber and output optical fiber in the other pair intersect each other at midpoints, so that the incident light from the input optical fiber in one pair is coupled to the output optical fiber in one pair, while the incident light from the input optical fiber in the other pair is coupled to the output optical fiber in the other pair. Moreover, since the pairs of input optical fibers and output optical fibers are formed into an optical fiber array, even when the pairs of input optical fibers and output optical fibers are tilted with respect to the lens, a relative tilt is not generated between the corresponding input optical fiber and output optical fiber, so that a loss resulting from angular misalignment can be prevented.

In the above optical isolator, it is preferable that the mode field diameter of each of the cores in those end portions of said input and output optical fibers which are closer to said lens is enlarged.

Thus, there can be prevented a loss accompanying an axial misalignment between the corresponding input optical fiber and output optical fiber, so that the production yield in assembly can be improved. Moreover, since the NA (numerical aperture) is reduced in a portion in which the mode field diameter is enlarged, the reflected light from the end of an optical fiber can be prevented even when the inclination of the end of the optical fiber is small.

In the above optical isolator, it is preferable that the output optical fiber in one of said pairs is optically connected to the input optical fiber in the other of said pairs.

As a result, the incident light from the input optical fiber in one pall is emitted from the output optical fiber in one pair and then incident upon the input optical fiber in the other pair, so as to be emitted from the output optical fiber the other pair. On the other hand, the incident light from the output optical fiber in the other pair is coupled in small amount to the input optical fiber in the other pair, while the small amount of light coupled to the input optical fiber in the other pair is incident upon the output optical fiber in one pair. However, the light incident from the output optical fiber in one pair is not substantially coupled to the input optical fiber in one pair but passes through the two-stage isolator, thereby performing a high isolating function. If there are a plurality of other pairs of input optical fibers and output optical fibers, a multi-stage isolating function can be performed.

It is preferable that the above optical isolator further comprises: a polarization-maintaining optical fiber provided on one end side of said lens so as to receive an incident ray which has a wavelength different from the wavelengths of the incident rays from said input optical fibers; and a wavelength selecting filter provided between said lens and said magneto-optical element so as to transmit the incident rays from said input optical fibers, while reflecting the incident light from said polarization-maintaining optical fiber to said input optical fiber or said output optical fiber.

As a result, the wavelength selecting filter transmits the incident rays of right from the input optical fibers, so that the incident light from each input optical fiber is connected to the corresponding output optical fiber, while the incident light from each output optical fiber is not coupled to the corresponding input optical fiber. Moreover, since the wavelength selecting filter reflects the linearly polarized incident light from the polarization-maintaining optical fiber to the input or output optical fiber, it becomes possible to combine the incident light from the input optical fiber or the light emitted to the output optical fiber with the incident light from the polarization-maintaining optical fiber.

Consequently, a single optical isolator can implement the multiplexing function and the optical isolating function.

In the above optical isolator, it is preferred that said reflecting mirror transmits a part of the incident ray from one of said input optical fibers and that said optical isolator further comprises a condenser lens for condensing the ray transmitted by said reflecting mirror and a photodetector for detecting the intensity of the ray condensed by said condenser lens.

Thus, the intensity of the incident ray from the above input optical fiber can be monitored. If one of the input optical fibers is used for inputting a signal, the presence or absence of the input signal can be detected. If the optical isolator is used in the optical fiber amplifier and the above input optical fiber is used for inputting a signal, the output level of the amplified light can be detected.

It is preferable that the above optical isolator further comprises: a first holder for integrally holding said input and output optical fibers, said polarization-maintaining optical fiber, said birefringent element, and said compensator; a second holder for integrally holding said lens, said wavelength selecting filter, and said magneto-optical element; and a distance adjusting member for variably setting the distance between said first holder and said second holder.

Thus, by adjusting the distance between the first holder and the second holder by means of the distance adjusting member, the light incident from the polarization-maintaining optical fiber and reflected by the wavelength selecting filter can be coupled optimumly to the input optical fiber or output optical fiber.

It is preferable that the above optical isolator further comprises: a first holding member which is provided so as to rotate around a first axis tilted with respect to the normal to said reflecting mirror and which securely holds said reflecting mirror; and a second holding member which is provided so as to rotate around a second axis coincident with the normal to said reflecting mirror and which holds said first holding member so that it can rotate in relation to said first axis.

The above optical isolator may further comprise: a first holding member which is provided so as to rotate around a first axis tilted with respect to the normal to said reflecting mirror and which securely holds said reflecting mirror; and a second holding member which is provided so as to rotate around second axis tilted at an angle different from said first axis with respect to the normal to said reflecting mirror and which holds said first holding member so that it can rotate in relation to said first axis.

Thus, if first holding element is rotated around the first axis between 0 and 180 degrees, the angle between the normal to the reflecting mirror and the incident light changes continuously within the range from 0 degree to double the angle at which the first axis is tilted. Furthermore, if the second holding member is rotated around the second axis between 0 to 360 degrees, the direction in which the first axis is tilted can be varied in all directions.

As a result, by determining the amount of rotation of the first holding member and the amount of rotation of the second holding member, the direction of the normal to the reflecting mirror can be set freely in all the directions around the second axis within the range from 0 degree to double the angle at which the first axis is tilted.

In the above optical isolator comprising the first and second holding members, it is preferable that said first holding member has an outer circumferential surface which is circular in cross section and said second holding member has an insertion hole which is circular in cross section, said first holding member being rotatably inserted into the insertion hole said second holding member, said first and second holding members having their respective contact portions which are in contact with each other in a plane at right angles to said first axis.

Since the first holding member and the second holding member are thus brought in contact with each other in a plane at right angles to the first axis, if the first holding member is rotated while it is kept in contact with the second holding member in the same plane, the first holding member is precisely rotated around the first axis.

As a result, even when the first holding member is fitted into the second holding member with an inferior accuracy, the angle of the reflecting mirror can be performed continuously. Moreover, an angular misalignment is seldom generated in the case of fixing the first holding member and the second holding member.

In the above optical isolator comprising the first and second holding members, it is preferable that the optical center of said reflecting mirror is set at the intersection of said first axis and said second axis.

Thus, since the optical center of the reflecting mirror does not shift with the rotation of the first and second holding members, the optical center of the reflecting mirror does not shift in the axial direction.

In the above optical isolator comprising the first and second holding members, it is preferable that a relationship of $\beta1>\beta2$ is set between an angle $\beta1$ which is formed between the optical axis of said lens and said First axis and an angle $\beta2$ which is formed between a plane at right angles to said first axis and the reflecting surface of said reflecting mirror.

Thus, since the substantially circular locus of the optical center of the reflecting mirror, which is produced with the rotation of the first holding member, becomes small in size, an increase in loss resulting from the rotation deviation can be prevented.

In the above optical isolator comprising the first and second holding members, it is preferable that each of said first holding member and second holding member is provided with a mark for indicating a relative positional relationship between said first holding member and second holding member in the circumferential direction when the normal to said reflecting mirror coincides with said second axis.

As a result, it becomes possible to place the center of the reflecting mirror at a specified optical center by rotating the first holding member from the position in which the normal to the reflecting mirror is coincident with the second axis to the position in which the mark on the first holding member falls at the intersection of the locus of the distance between the center of the optical axis of the lens and the optical center of the reflecting mirror and the locus of the optical center of the reflecting mirror produced with the rotation of the first holding member and then rotating the second holding member till the above intersection comes to the optical center of the reflecting mirror.

Consequently, an adjusting operation for placing the center of the reflecting mirror at a specified optical center can be performed in a reduced period of time.

It is preferable that the above optical isolator further comprises: a first and second polarization-maintaining optical fibers provided on one end side of said lens so as to receive incident rays which have wavelengths different from the wavelengths of the incident rays from said input optical fibers; a wavelength selecting filter provided between said lens and said magneto-optical element so as to transmit the incident rays from said input optical fibers, while reflecting the incident ray from said first polarization-maintaining optical fiber to one of said input optical fibers and reflecting the incident ray from said second polarization-maintaining optical fiber to one of said output optical fibers; and another compensator provided in the optical path of the incident ray from said second polarization-maintaining optical fiber between said birefringent element and said lens so as to rotate 45 degrees the planes of polarization of the rays which pass therethrough in the direction opposite to the direction in which said compensator rotates them.

Thus, the wavelength selecting filter transmits the rays of incident light from the input optical fibers, so that the incident light from each input optical fiber is coupled to the corresponding output optical fiber, while the incident light from each output optical fibers is not coupled to the corresponding input optical fiber. Moreover, the wavelength selecting filter reflects the linearly polarized incident light from the first polarization-maintaining optical fiber to one of the input optical fibers, so that the incident light from the input optical fiber can be combined with the incident light from the first polarization-maintaining optical fiber. Furthermore, the wavelength selecting filter reflects the linearly polarized incident light from the second polarization-maintaining optical fiber to one of the output optical fibers, so that the light emitted to the output optical fiber can be combined with the incident light from the second polarization-maintaining optical fiber.

Consequently, a single optical isolator can implement: the two multiplexing functions of combining the incident light from the input optical fiber with the light emitted from the first polarization-maintaining optical fiber and of combining the light emitted to the output optical fiber with the incident light from the second polarization-maintaining optical fiber; and the above optical isolating function.

A first optical fiber amplifier according to the present invention comprises: a lens for converting incident light into collimated light; a plurality of pairs of input optical fibers and output optical fibers provided on one end side of said lens: a reflecting mirror provided on the other end side of said lens so as to reflect incident rays from said input optical fibers, which passed through said lens, to said output optical fibers which correspond individually to said input optical fibers; a birefringent element provided between said lens and said input and output optical fibers so as to resolve light which passes therethrough into an ordinary ray and an extraordinary ray, which are linearly polarized rays at right angles to each other; a compensator provided in the optical paths of the incident rays from said input optical fibers between said lens and said birefringent element or in the optical paths of the rays emitted to said output optical fibers so as to rotate 45 degrees the planes of polarization of the rays which pass therethrough; a magneto-optical element provided between said lens and said reflecting mirror so as to rotate 22.5 degrees the planes of polarization of the rays which pass therethrough; an amplification optical fiber which has one terminal connected to the output optical fiber in one of said pairs and the other terminal connected to the input optical fiber in the other of said pairs via an optical multiplexer: and an excitation light source for outputting excitation light to said amplification optical fiber via said optical multiplexer, said compensator and said magneto-optical element rotating the planes of polarization of the rays emitted from said input optical fibers in the same direction.

Thus, one terminal of the amplification optical fiber to which the excitation light is inputted via the multiplexer is connected to the output optical fiber in one pair, while the other terminal of the amplification optical fiber is connected to the input optical fiber in the other pair via the optical multiplexer, so that the optical isolator on the input side of the amplification optical fiber and the optical isolator on the output side of the optical isolator can be implemented by a single optical isolator.

Consequently, a miniaturized optical fiber amplifier can be implemented at low cost, since one terminal of the amplification optical fiber is connected to the output optical fiber in one pair, while the other terminal of the amplification optical fiber is connected to the input optical fiber in the other pair via the optical multiplexer, thereby implementing the optical isolators on the input side and output side of the amplification optical fiber by a single optical isolator.

A second optical fiber amplifier according to the present invention comprises: a lens for converting incident light into collimated light; a plurality of pairs of input optical fibers and output optical fibers provided on one end side of said lens; a polarization-maintaining optical fiber provided on one end side of said lens; a reflecting mirror provided on the other end side of said lens so as to reflect incident rays from said input optical fibers, which passed through said lens, to said output optical fibers which correspond individually to said input optical fibers; a birefringent element provided between said lens and said input and output optical fibers so as to resolve light which passes therethrough into an ordinary ray and an extraordinary ray, which are linearly polarized rays at right angles to each other; a compensator provided in the optical paths of the incident rays from said input optical fibers between said lens and said birefringent element or in the optical paths of the rays emitted to said output optical fibers so as to rotate 45 degrees the planes of polarization of the rays which pass therethrough; a magneto-optical element provided between said lens and said reflecting mirror so as to rotate 22.5 degrees the planes of polarization of the rays which pass therethrough; an amplification optical fiber which has one terminal connected to the output optical fiber in one of said pairs and the other terminal connected to the input optical fiber in the other of said pairs; an excitation light source for outputting excitation light to said polarization-maintaining optical fiber; and a wavelength selecting filter provided between said lens and said magneto-optical element, which transmits incident rays from said input optical fibers while reflecting the excitation light incident from said polarization-maintaining optical fiber to the input optical fiber in the other of said pairs or to the output optical fiber in one of said pairs, said compensator and said magneto-optical element rotating the planes of polarization of the rays emitted from said input optical fibers in the same direction.

The signal light thus incident from the input optical fiber in one pair is excited in the amplification optical fiber by the excitation light outputted from the polarization-maintaining optical fiber so as to be amplified and emitted from the output optical fiber in the other pair as amplified signal light. In this case, if the excitation light from the polarization-maintaining optical fiber is inputted to the input optical fiber in the other pair, the backward excitation system will be implemented. On the other hand, if the excitation light from the polarization-maintaining optical fiber is inputted to the output optical fiber in one of the pairs, the forward excitation system will be implemented. Consequently, the two isolating functions on the input side and output side of the amplification optical fiber and the multiplexing function of combining the signal light with the excitation light are performed by a single optical isolator, so that a miniaturized optical amplifier with the two isolating functions and the multiplexing function can be implemented at low cost.

A third optical fiber amplifier according to the present invention comprises: a lens for converting incident light into collimated light; a plurality of pairs of input optical fibers and output optical fibers provided on one end side of said lens; a first and second polarization-maintaining optical fibers provided on one end side of said lens; a reflecting mirror provided on the other end side of said lens so as to reflect incident rays from said input optical fibers, which passed through said lens, to said output optical fibers which correspond individually to said input optical fibers; a birefringent element provided between said lens and said input and output optical fibers so as to resolve light which passes therethrough into an ordinary ray and an extraordinary ray, which are linearly polarized rays at right angles to each other; a compensator provided in the optical paths of the incident rays from said input optical fibers between said lens and said birefringent element or in the optical paths of the rays emitted to said output optical fibers so as to rotate 45 degrees the planes of polarization of the rays which pass therethrough; a magneto-optical element provided between said lens and said reflecting mirror so as to rotate 22.5 degrees the planes of polarization of the rays which pass therethrough; an amplification optical fiber which has one terminal connected to the output optical fiber in one of said pairs and the other terminal connected to the input optical fiber in the other of said pairs; an excitation light source for inputting excitation light to said first and second polarization-maintaining optical fibers; and a wavelength selecting filter provided between said lens and said magneto-optical element, which transmits incident rays from said input optical fibers while reflecting the excitation light incident from said first polarization-maintaining optical fiber to the input optical fiber in the other of said pairs and reflecting the excitation light incident from said second polarization-maintaining optical fiber to the output optical fiber in one of said pairs, said compensator and said magneto-optical element rotating the planes of polarization of the rays emitted from said input optical fibers in the same direction.

The signal light thus inputted from the input optical fiber in one pair is subjected to backward excitation in the amplification optical fiber by the excitation light outputted from the first polarization-maintaining optical fiber and inputted via the input optical fiber in the other pair, while it is subjected to forward excitation there by the excitation light outputted from the second polarization-maintaining optical fiber and inputted via the output optical fiber in one pair.

Consequently, the two isolating functions on the input side and output side of the amplification optical fiber and two multiplexing functions of combining the signal light with the forward excitation light and combining the signal light with the backward excitation light are implemented by a single optical isolator, so that a miniaturized optical amplifier with the two isolating functions and the multiplexing function in accordance with the bidirectional excitation system can be implemented at low cost.

In the above first to third optical fiber amplifiers, it is preferable that said reflecting mirror transmits a part of the incident ray from said input optical fiber in the other pair and that said optical fiber amplifier further comprises a condenser lens for condensing the amplified ray transmitted by said reflecting mirror, a photodetector for detecting the intensity of the amplified ray condensed by said condenser lens, and driving means for controlling, based on the intensity of the amplified ray detected by said photodetector, the output of excitation light outputted from said excitation light source.

Thus, the intensity of the amplified light incident from the input optical fiber in the other pair and transmitted by the reflecting mirror is detected by the photodetector so that the intensity of the excitation light outputted from the excitation light source can be controlled based on the detected intensity of the amplified light, thereby controlling the driving means so that the output of the amplified light is kept at a constant value.

BRIEF DESCRIPTION OF THE DRAWINGS

FIG. 14 is a view showing optical paths along the center axes of optical fibers in the optical isolator according to a fifth embodiment;

FIG. 15 is a view showing an example of the arrangement in the optical fiber array in the optical isolator according to the above fifth embodiment;

FIGS. 19(*a*), 19(*b*), and 19(*c*) are views illustrating the variations of the locus of an optical center which are produced at different angles set by angle adjusting elements in the optical isolator according to the above third embodiment;

FIG. 23 is a cross-sectional view showing another built-up structure of the optical isolator according to the above third embodiment;

DETAILED DESCRIPTION OF THE PREFERRED EMBODIMENTS

Below, the preferred embodiments of the present invention will be described with reference to the drawings.

Figure 1:
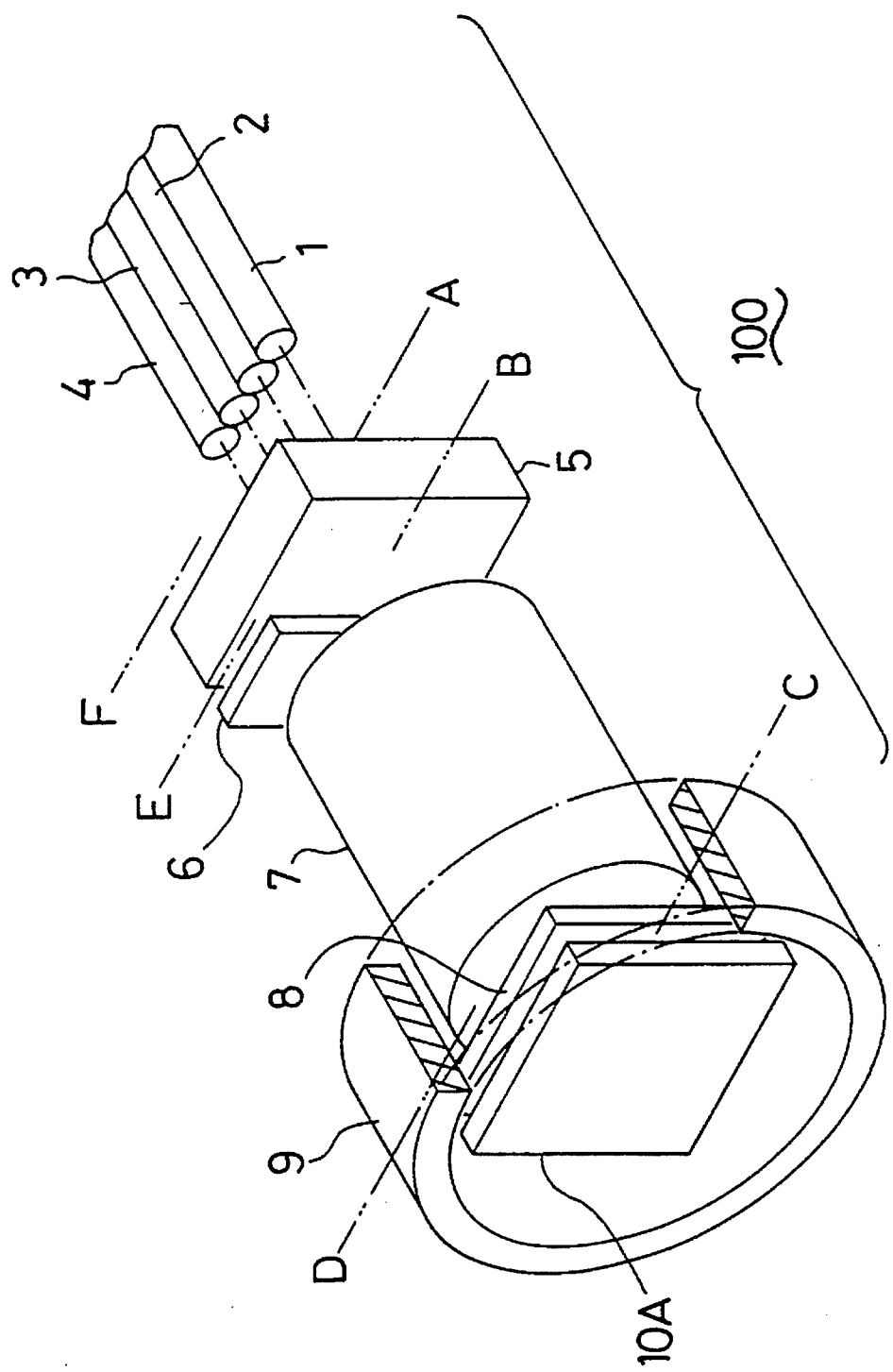
FIG. 1 is a perspective view of an optical isolator according to a first embodiment of the present invention.
Figure 2:
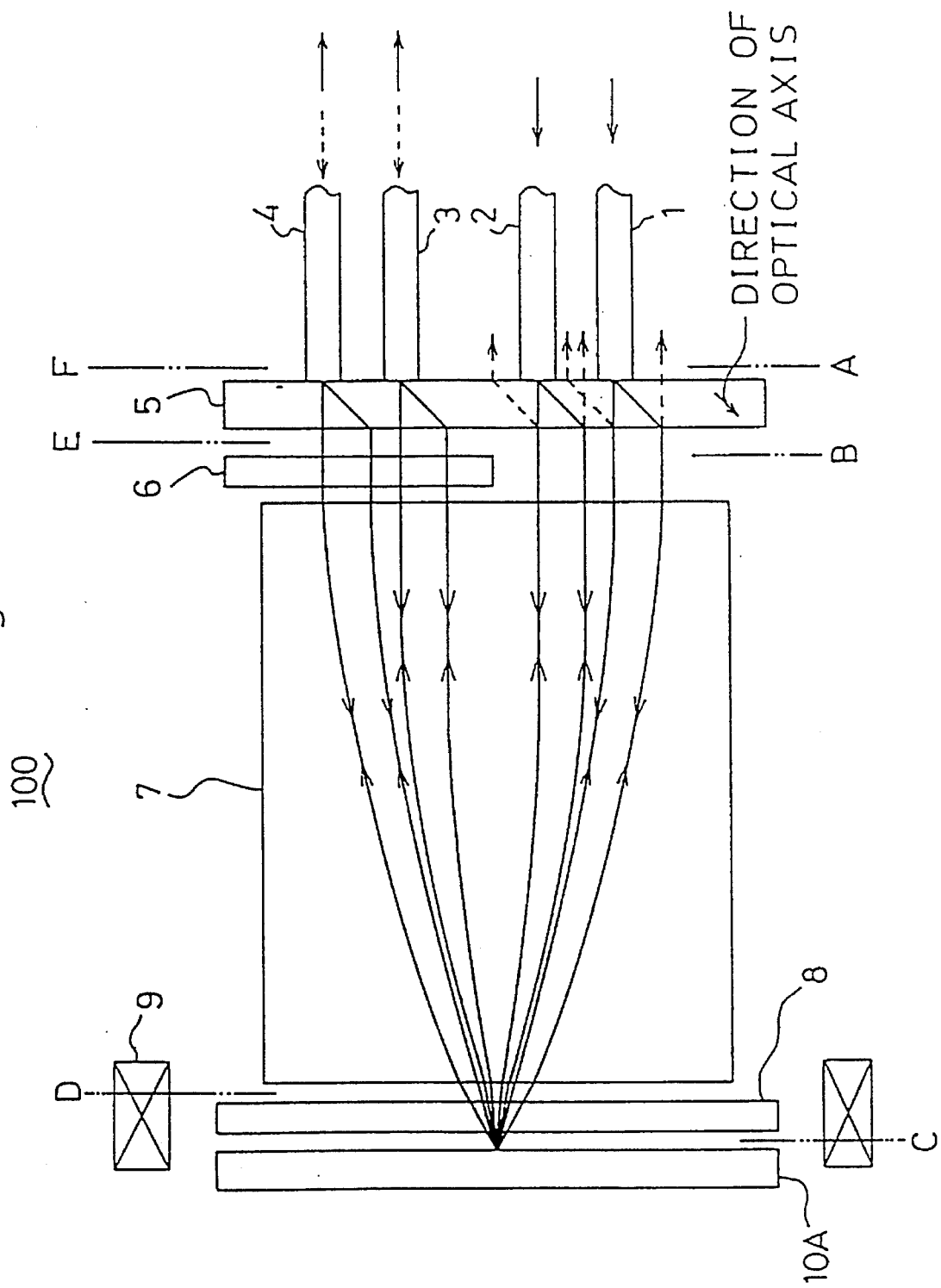
FIG. 2 is a view showing optical paths along the center axes of optical fibers in the optical isolator according to the above first embodiment.

FIG. 1 shows the structure of an optical isolator 100 according to a first embodiment of the present invention. FIG. 2 shows optical paths along the center axes of optical fibers in the foregoing optical isolator 100. In FIGS. 1 and 2, reference symbols A to F designate points at which the state of polarization or coupling position changes. In FIG. 2, the optical paths in the forward direction are indicated by solid lines, while optical paths in the reverse direction are indicated by broken lines.

FIGS. 1 and 2, a reference numeral 1 designates a first input optical fiber, 2 designates a second input optical fiber, 4 designates a first output optical fiber upon which the light emitted from the first input optical fiber 1 is incident, and 3 designates a second output optical fiber upon which the light emitted from the second input optical fiber 2 is incident. The first and second input optical fibers 1 and 2 and the first and second output optical fibers 4 and 3 are aligned with respect to each other.

Figure 3:
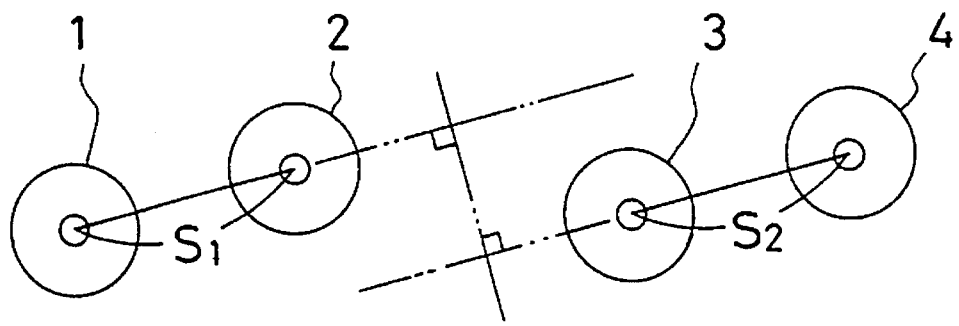
FIG. 3 is a view showing requirements on the arrangement of input optical fibers and output optical fibers in the optical isolator according to the above first embodiment.

To provide connections between the first input optical fiber 1 and the first output optical fiber 4 and between the second input optical fiber 2 and the second output optical fiber 3, the following requirements on their arrangement should be satisfied: that is, as shown in FIG. 3, the distance S1 between the center of the first input optical fiber 1 and the center of the second input optical fiber 2 should be equal to the distance S2 between the center of the first output optical fiber 4 and the center of the second output optical fiber 3; and the connecting line between the center of the first input optical fiber 1 and the center of the second input optical fiber 2 should be parallel to the connecting line between the center of the first output optical fiber 4 and the center of the second output optical fiber 8. If these arrangement requirements are satisfied, the connecting line between the first input optical fiber 1 and the first output optical fiber 4 and the connecting line between the second input optical fiber 2 and the second output optical fiber 3 intersect each other at midpoints. If these arrangement requirements are not satisfied completely, on the other hand, an inversion loss in either of the coupling systems constituted by the input and output optical fibers increases accordingly.

A birefringent element 5 composed of a futile crystal or the like resolves a ray of light with random polarized planes into an ordinary-ray component and an extraordinary-ray component, which are linearly polarized components at right angles to each other (however, the light is not resolved in the case where linearly polarized light in a direction equal to or right angles to the optical axis of the crystal composing the birefringent element 5 is incident, but follows an optical path depending on the state of polarization at the time of incidence). A compensator 6 is provided in the optical paths of the first and second output optical fibers 4 and 3 so as to rotate the plane of polarization of transmitted light 45 degrees. As the compensator 6, an optically rotating element or a half-wave plate with the principal axis fixed in a specified direction can be used. A converging rod lens 7 (hereinafter, briefly referred to as a lens) has the distribution of a refraction index which is greatest in its center axis and gradually decreasing toward its circumference. The light incident upon a caustic surface on the side of one end of the lens 7 has the characteristic of being emitted substantially parallel from the other end thereof. A magneto-optical element 8 composed of a garnet crystal or the like rotates the plane of polarization of transmitted light depending on the intensity of a magnetic field. Normally, to the magneto-optical element 8 is applied a magnetic field as intense as or intenser than the saturation region of the magneto-optical element 8 (with Bi-substituted garnet, e.g., the saturation magnetic field: <1250 (Oe)). The amount of rotation of the polarization plane of transmitted light is controlled by the thickness of the magneto-optical element 8. In the present embodiment, the thickness of the magneto-optical element 8 is set so that the amount of rotation of the polarization plane of transmitted light becomes 22.5 degrees. Around the magneto-optical element 8 is disposed a ring-shaped permanent magnet 9 for applying a magnetic field to the magneto-optical element 8 in the direction of its thickness. The permanent magnet 9 is formed from samarium-cobalt (Sm-Co) having a large coercive force. Although the present embodiment has used the permanent magnet 9 as a magnet for applying a magnetic field to the magneto-optical element 8, it will be appreciated that an electro-magnet can be used in place of the permanent magnet 9. The reflecting mirror 10A reflects the collimated light emitted from the other end of the lens 7 by changing the optical path thereof.

Below, a description will be given to the operation of the optical, isolator 100 thus constituted with the reference to FIG. 5. The direction of light polarization shown in FIGS. 4 and 5 was obtained when viewed from the optical fiber side.

Figure 4:
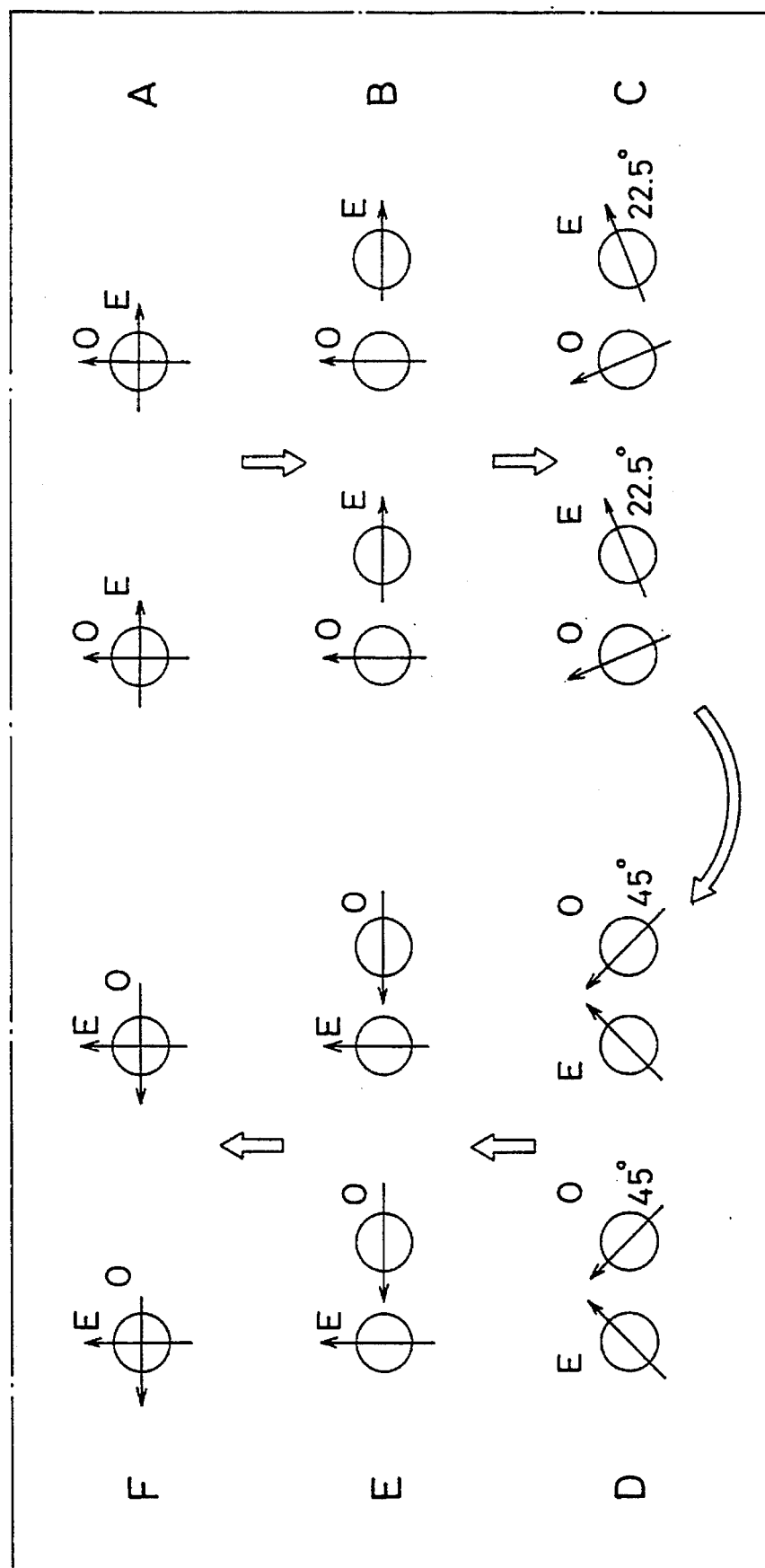
FIG. 4 is a view showing incident light in the forward direction from the input optical fiber which has been polarized in the optical isolator according to the above first embodiment.

FIG. 4 shows the planes of polarization at points A to F of the incident rays of light from the first and second input optical fibers 1 and 2.

The incident light from each of the first and second input optical fibers 1 and 2 has random polarized components at the point A. After passing through the birefringent element 5, the incident light is resolved into an ordinary ray and an extraordinary ray at the point B, which are linearly polarized components at right angles to each other. The ordinary ray and extraordinary ray obtained through the resolution by the birefringent element 5 are converted to substantially collimated rays by the lens 7, which are then incident upon the magneto-optical element 8. After passing through the magneto-optical element 8, the planes of polarization of the rays have been rotated 22.5 degrees at the point C. The substantially collimated rays transmitted by the magneto-optical element 8 are reflected by the reflecting surface of the reflecting mirror 10A, so as to pass through the magneto-optical element 8 again. As a result, the planes of polarization of the rays are further rotated 22.5 degrees at the point D, which means that the planes of polarization of the light at the point D have been rotated 45 degrees in all since the rays were emitted from the birefringent element 5. The rays which have passed through the magneto-optical element 8 are made incident upon the compensator 6, while being converged by the lens 7. After passing through the compensator 6, the planes of polarization of the rays have been rotated 45 degrees more at the point E, which means that the planes of polarization of the rays incident upon the birefringent element 5 have been rotated 90 degrees more than they were at the point B. Hence, the light emitted from the first input optical fiber 1 is coupled to the first output optical fiber 4, while the light emitted from the second input optical fiber 2 is coupled to the second output optical fiber 3, at the point F after passing through the birefringent element 5.

Figure 5:
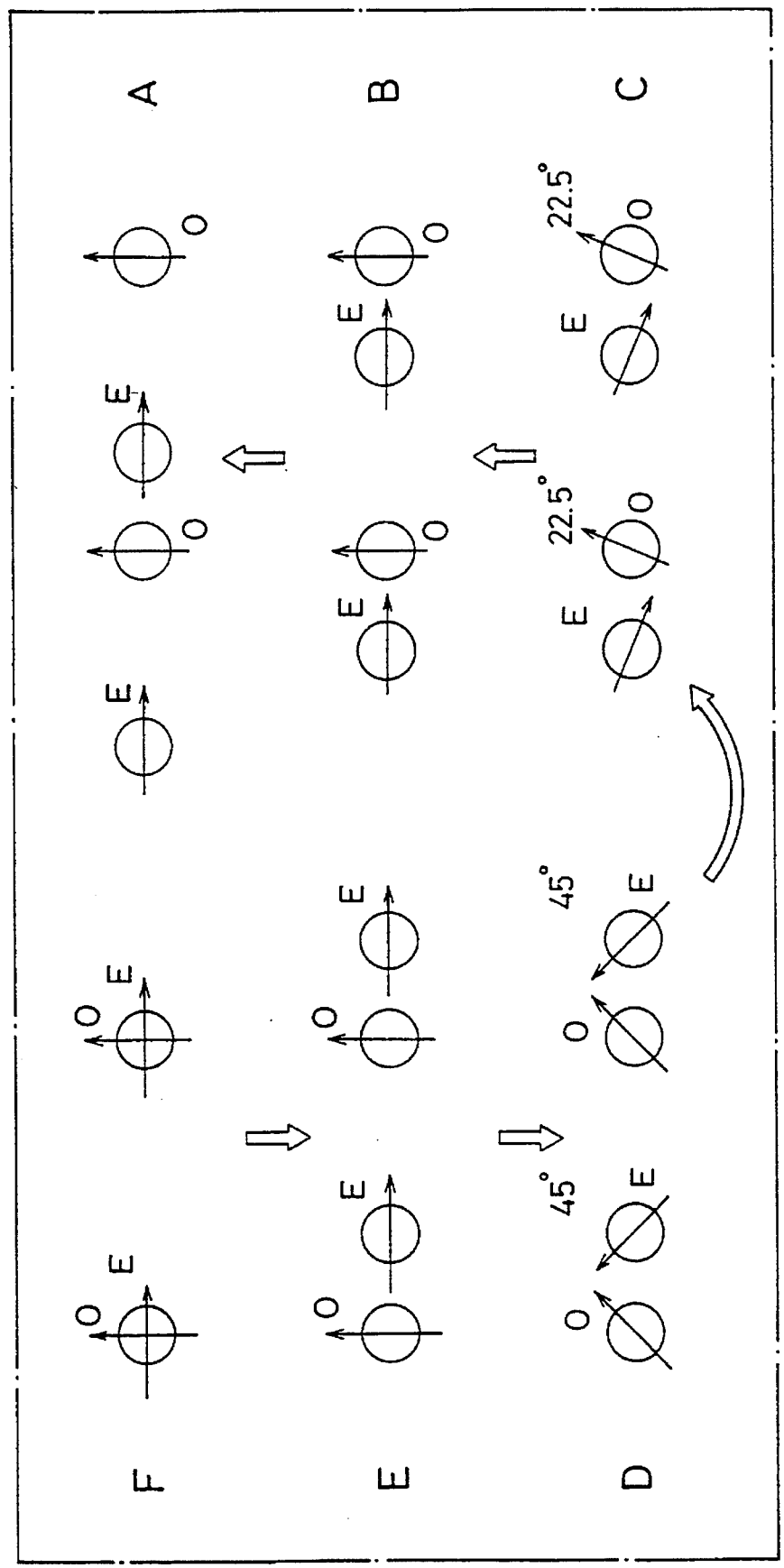
FIG. 5 is a view showing incident light in the reverse direction from the output optical fiber which has been polarized in the optical isolator according to the above first embodiment.

FIG. 5 shows the planes of polarization of the rays of light emitted from the first and second output optical fibers 4 and 3 at the points F to A.

The incident light in the reverse direction from each of the first and second output optical fibers 4 and 3 has random polarization components at the point F. After passing through the birefringent element 5, the incident light is resolved into arm ordinary ray and an extraordinary ray at the point E, which are linearly polarized components at right angles to each other. The resulting ordinary ray and extraordinary ray are incident upon the compensator 6. After passing through the compensator 6, the polarization planes of the rays at the point D have been rotated 45 degrees. The rays transmitted by the compensator 6 are converted to substantially collimated rays by the lens 7, so as to be incident upon the magneto-optical element 8. Since the direction of the magnetic field applied to the rays in the reverse direction which pass through the magneto-optical element 8 is opposite to the direction of the magnetic field applied to the rays in the forward direction, it follows that the planes of the polarization of the rays in the reverse direction have been rotated 22.5 degrees in all (45 degrees–22.5 degrees) at the point C after they passed through the magneto-optical element 8. The rays in the reverse direction are reflected by the reflecting surface of the reflecting mirror 10A and pass through the magneto-optical element 8 again, so that the planes of polarization at the point B of the rays in the reverse direction have been rotated 0 degree more than they were at the point E (22.5 degrees–22.5 degrees). In other words, the planes of polarization at the point B are coincident with the planes of polarization at the point E. Consequently, the rays of light emitted from the first and second output optical fibers 4 and 3 are not coupled to the first and second input optical fibers 1 and 2.

Although the above first embodiment has used the converging rod lens as the lens 7, another lens may be used provided that it performs a similar coupling function. It is preferable that the end face of the lens 7 and the end face of an optical fiber array are processed obliquely by polishing.

Thus, according to the optical isolator according to the first embodiment, the First and second input optical fibers 1 and 2 and the first and second output optical fibers 4 and 3 are arranged so as to satisfy the arrangement requirements described above. Moreover, since the birefringent element 5, lens 7, magneto-optical element 8, and reflecting mirror 10A are arranged in this order and the compensator 6 is provided in the optical paths of the first and second output optical fibers 4 and 3 between the lens 7 and birefringent element 5, a miniaturized optical isolator with a reduced number of parts can be implemented at lower cost. If the first and second input optical fibers 1 and 2 and the first and second output optical fibers 3 and 4 are formed into an array, the number of points at which the optical axis should be adjusted is reduced, resulting in improved assembly efficiency.

Figure 6:
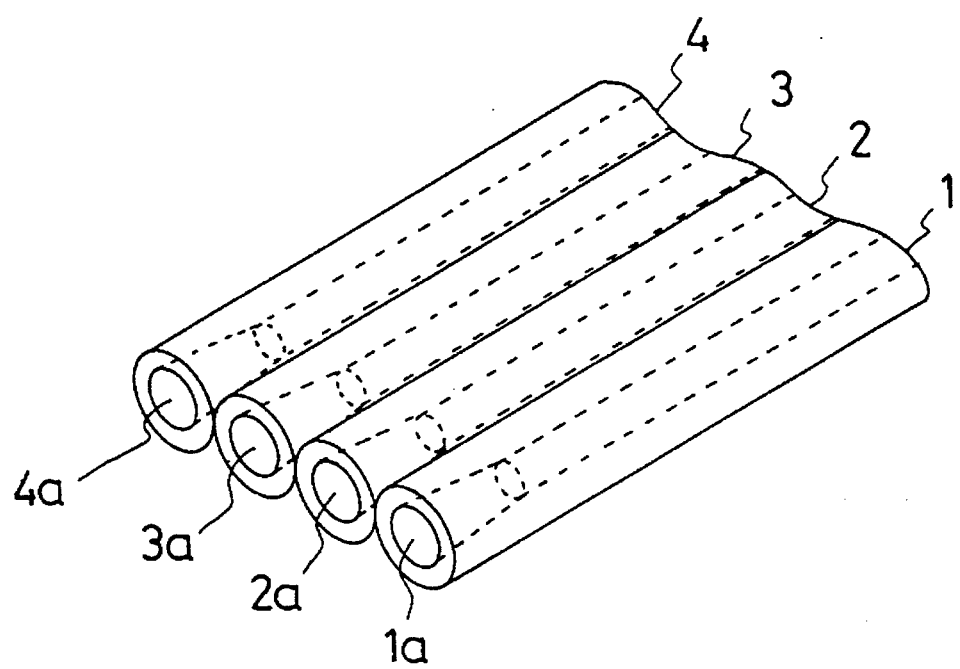
FIG. 6 is a view showing an example of the arrangement in a first variation of an optical fiber array in the optical isolator according to the above first embodiment.

FIG. 6 shows a first variation of an optical fiber array in the optical isolator according to the first embodiment. In the first variation, the first and second input optical fibers 1 and 2 and the first and second output optical fibers 4 and 3 are aligned with respect to each other, while the mode field diameters of the cores 1a to 4a at the ends of the input and output optical fibers 1 to 4 are enlarged.

The connections thus provided between the input optical fibers and output optical fibers in which the mode field diameters of the end cores are enlarged are characterized in that the effect of a loss resulting from axial displacement can be lessened, while the production yield in manufacturing a built-up structure can be improved. Although the angular misalignment resulting from the enlarged mode field diameters of the end cores increases the loss disadvantageously, since the input optical fibers and output optical fibers to be connected are formed into a single array, relative tilts are not generated between the input optical fibers and the output optical fibers if the input and output optical fibers are tilted with respect to the lens, so that the effect of the angular misalignment on the loss increase is negligible.

Furthermore, if the mode field diameters of the end cores of the input and output optical fibers are enlarged, reflected light from the ends of the optical fibers can be suppressed, so that the inclinations of the ends of the optical fiber can be reduced advantageously.

Figure 7:
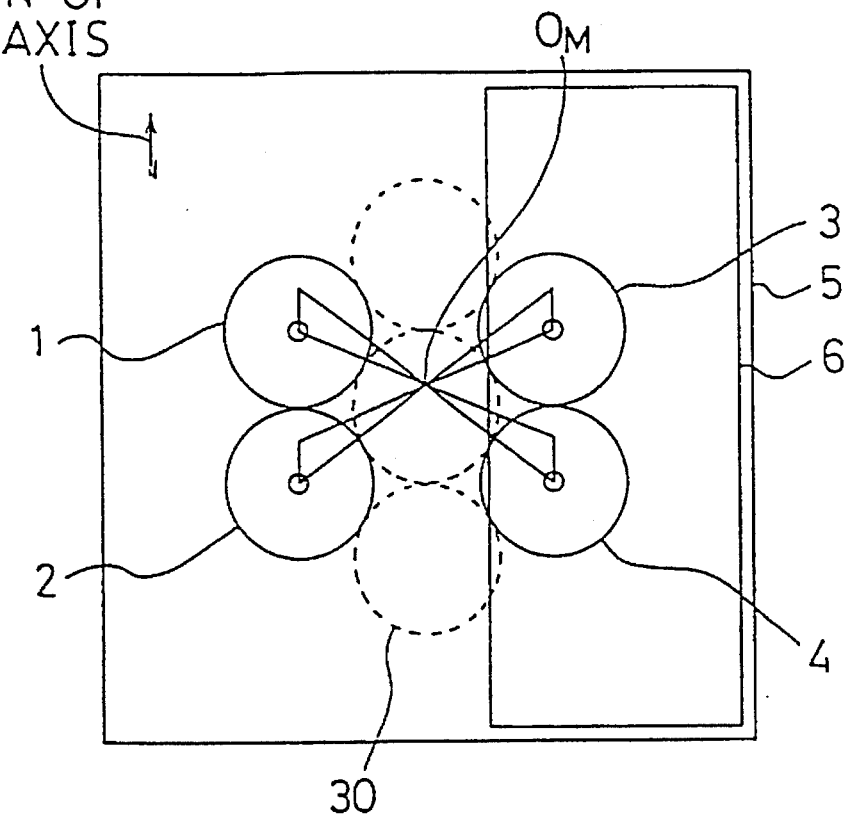
FIG. 7 is a view showing an example of the arrangement in a second variation of the optical fiber array in the optical isolator according to the above first embodiment.

FIG. 7 shows another variation of the optical fiber array arranged in the optical isolator according to the above first embodiment. In the drawing, connecting lines between the input optical fibers and the output optical fibers indicate a coupling relation between the ordinary ray and the extraordinary ray on the end face of the lens (the same shall apply to a view showing the arrangement in the optical fiber array, which will be described later).

As shown in FIG. 7, seven optical fibers including pairs of input optical fibers and output optical fibers and three dummy optical fibers 30 are arranged close to each other so that they form a hexagon in cross section. In the arrangement, each input optical fiber and the corresponding output optical fiber are diagonally positioned with the three dummy optical fibers 30 interposed therebetween. In this case, the compensator 6 is placed only in the optical paths of the first and second output optical fibers 4 and 3. With the arrangement, the distance between the center of the lens and each of the optical fibers to be connected can be reduced, so that the influence on the aberration of the lens is reduced. Moreover, since the optical fibers are easily brought into contact with each other, they can be arranged with an improved accuracy, thereby reducing a loss at connections.

Figure 8:
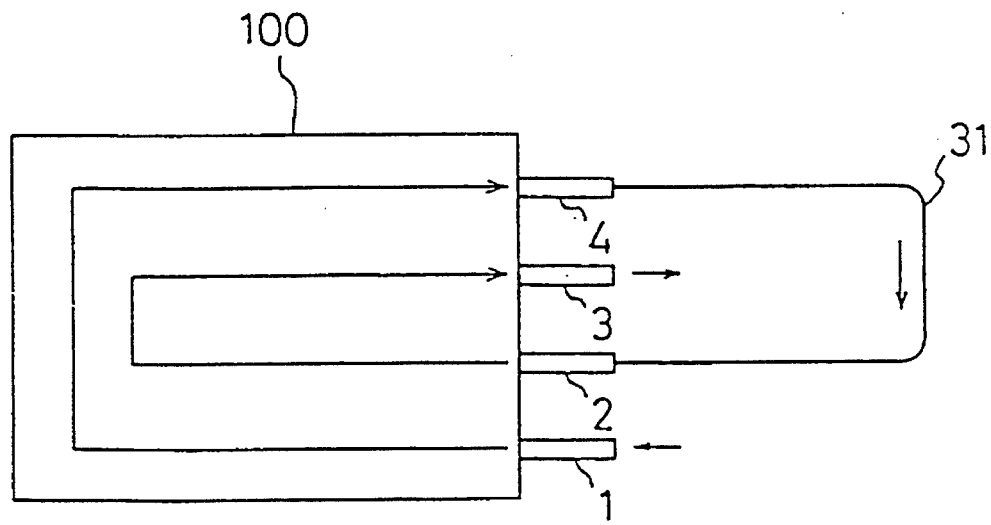
FIG. 8 is a view showing the structure of an isolator for if high degree of isolation to which the optical isolator according to the above first embodiment is applied.

FIG. 8 shows a variation of the optical isolator according to the first embodiment. In the variation, the output side of the first output optical fiber 4 is connected to the input side of the input optical fiber 2 by the connecting optical fiber 31. With the structure, the light returning from the second output optical fiber 3 serving as the output terminal passes through the isolator in two stages from the second input optical fiber 2 to the second output optical fiber 8 and from the first input optical fiber 1 to the first output optical fiber 4, so that a high degree of isolation can be expected. Although the variation has described the two-stage isolator, a multi-stage isolator can be implemented by increasing the number of the input optical fibers and output optical fibers, so that an optical isolator with an excellent isolating characteristic can be obtained.

Figure 9:
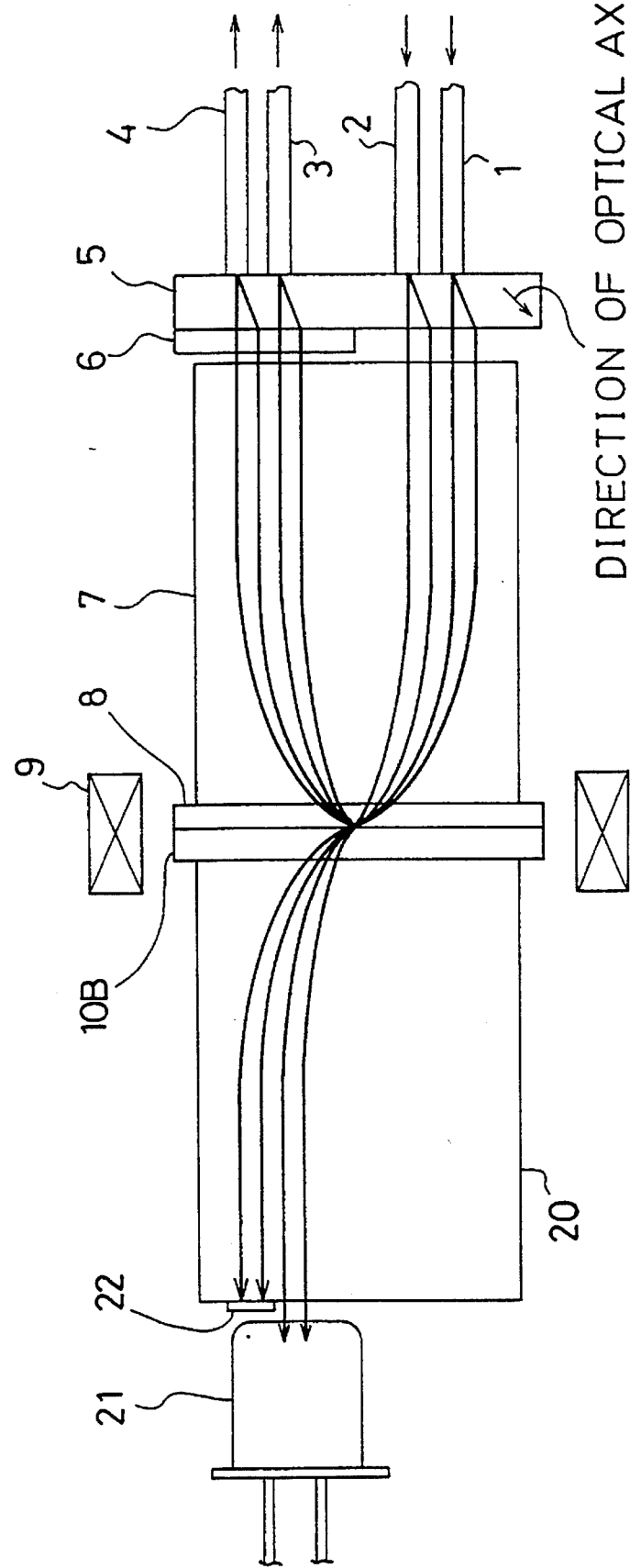
FIG. 9 is a view showing optical paths along the center axes of optical fibers in the optical isolator according to a second embodiment.

Below, an optical isolator 200 according to a second embodiment of the present invention will be described with reference to FIG. 9.

The isolator 200 of the second embodiment was obtained by providing the optical isolator 100 of the first embodiment with an optical monitoring function. The structure of the second embodiment is different from that of the first embodiment in that a reflecting mirror 10B which transmits 1% of light while reflecting 99% of the light is used in place of the reflecting mirror 10A of the first embodiment, so that the light transmitted by the reflecting mirror 10B is coupled by a condenser lens 20 to a semiconductor light-receiving element 21. With the structure, a part of the incident light From the first and second input optical fibers 1 and 2 is transmitted by the reflecting mirror 10B and then coupled by the condenser lens 20 to the semiconductor light-receiving element 21 as a photodetector. In this case, since the light is incident from the first and second input optical fibers 1 and 2, the condenser lens 20 is coated with a black absorber 22 so as to intercept the incident light from the first input optical fiber 1.

With the structure, it becomes possible to monitor a part of signal light, so that, in the case of using the optical isolator of the second embodiment in an optical fiber amplifier, the presence or absence of an input signal as well as the optical output level after amplification can be detected.

Figure 10:
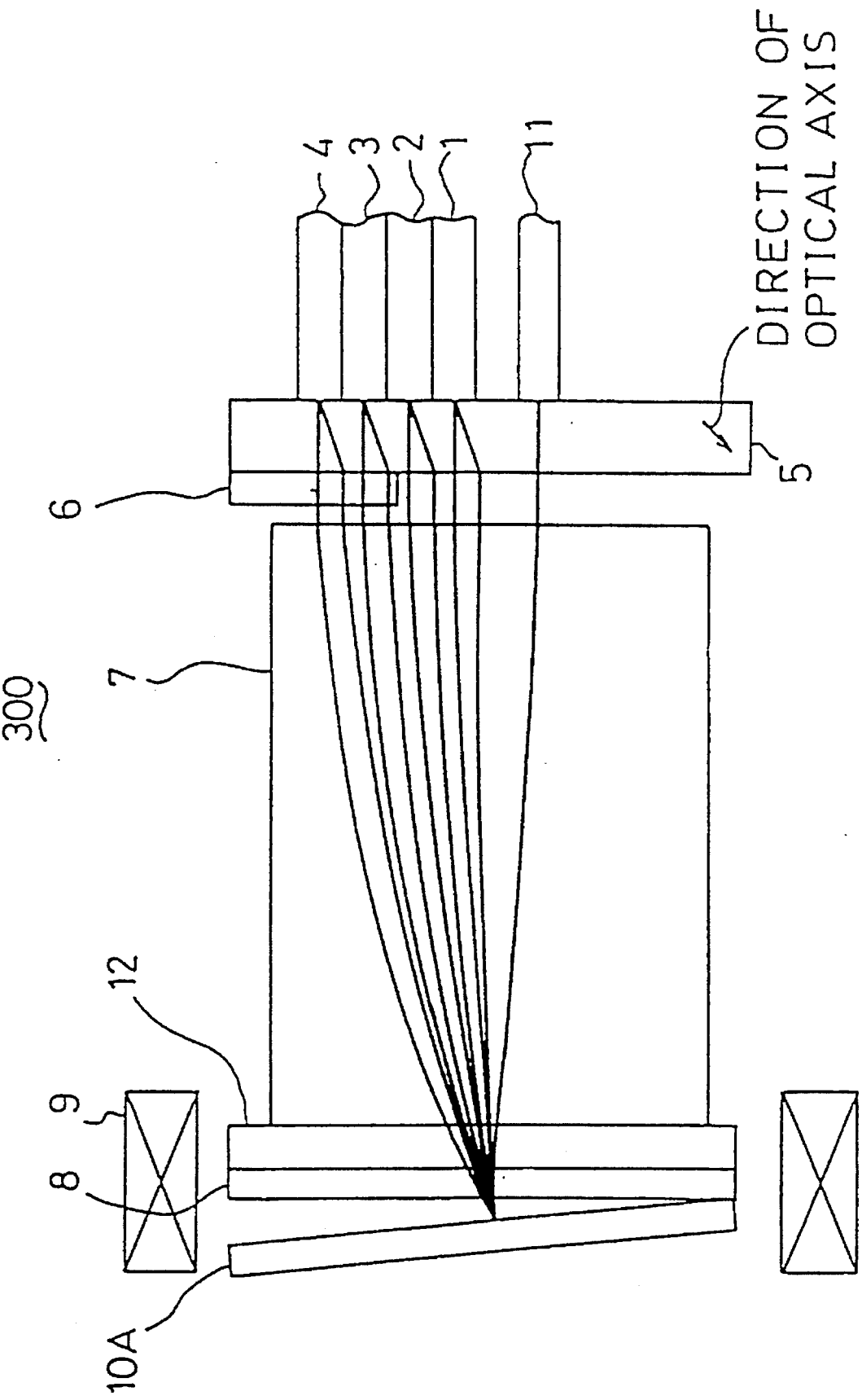
FIG 10 is a view showing optical paths along the center axes of optical fibers in the optical isolator according to a third embodiment.

Below, an optical isolator 300 according to a third embodiment of the present invention will be described with reference to FIG. 10.

The optical isolator 300 of the third embodiment was obtained by incorporating an optical multiplexer into the main body of an optical isolator. The structure of the present embodiment is different from that of the first embodiment in that a polarization-maintaining optical fiber 11 is provided and that a wavelength selecting filter 12 is provided between the magneto-optical element 8 and the lens 7 in order to couple the incident light from the polarization-maintaining optical fiber 11 to the first input optical fiber 1. The polarization plane of the polarization-maintaining optical fiber 11 is controlled so that the linearly polarized incident light from the polarization-maintaining optical fiber 11 functions as an ordinary ray with respect to the birefringent element 5. The wavelength selecting filter 12 transmits the incident rays of light from the first and second input optical fibers 1 and 2, while it reflects the incident light from the polarization-maintaining optical fiber 11 so as to couple the reflected light to the optical fiber 1. Although an arrangement is made so that the incident light from the polarization-maintaining optical fiber 11 functions as an ordinary ray in the third embodiment, it will be appreciated that an arrangement can be made so that the incident light from the polarization-maintaining optical fiber 11 functions as an extraordinary ray. As for the other components, they are the same as those of the optical isolator 100 in the first embodiment, so that the description thereof will be omitted by providing like components with like reference numerals.

Below, a description will be given to the operation of the optical isolator 300 of the third embodiment.

The incident light from the polarization-maintaining optical fiber 11, which is linearly polarized light at a wavelength $\lambda_1$, functions as an ordinary ray, so that it is reflected by the wavelength selecting filter 12 and coupled to the first input optical fiber 1.

The incident light in the forward direction from the first and second input optical fibers 1 and 2 at a wavelength $\lambda_2$, which has random polarized components, is resolved by the birefringent element 5 into an ordinary-ray component and an extra-ordinary-ray component, which are linearly polarized rays at right angles to each other. After that, tile resulting components are transmitted by the lens 7 and by the wavelength selecting filter 12, so as to be coupled to the first and second output optical fibers 4 and 3 by the same function as performed in the first embodiment. On the other hand, the incident light in the reverse direction from the first and second output optical fibers 4 and 3 at a wavelength $\lambda_2$ is transmitted by the wavelength selecting filter 12 and is not coupled to the first and second input optical fibers 1 and 2 by the same function as performed in the first embodiment.

Figure 11:
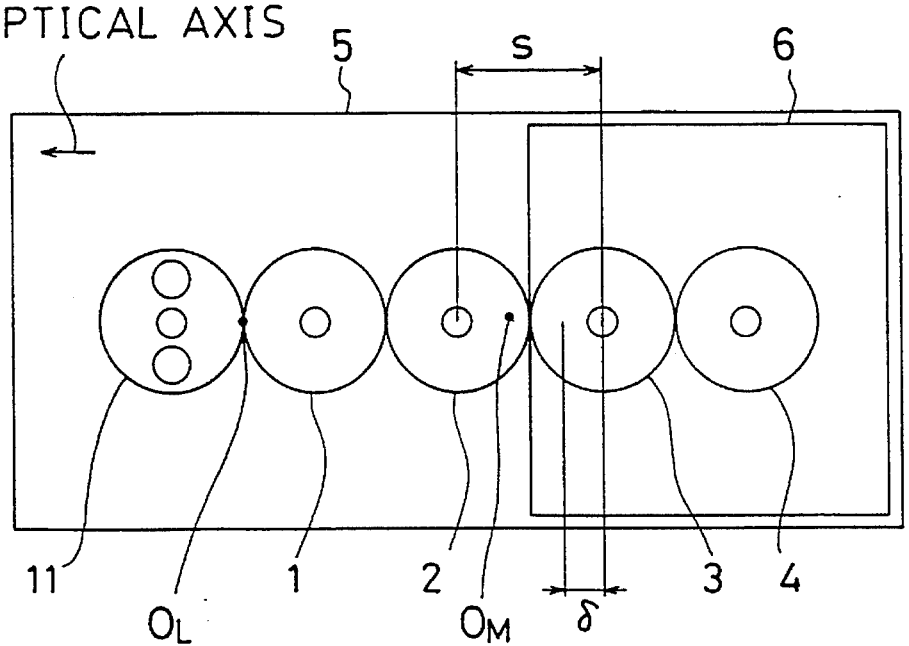
FIG. 11 is a view showing an example of the arrangement in the optical fiber array in the optical isolator according to the above third embodiment.

FIG. 11 shows, as an example of the arrangement of optical fibers that satisfies the above coupling relations, a case in which five optical fibers are aligned with respect to each other. The lens center $0_L$ is at the midpoint between the center of the polarization-maintaining optical fiber 11 and the center of the first input optical fiber 1. If the distance between the second input optical fiber 2 and the second output optical fiber 3 is represented by s and the distance between the rays resulting from the resolution of light by the birefringent element 5 is represented by δ, the optical center $0_M$ of the reflecting mirror 10A changes positions from the center of the second input optical fiber 2 toward the center of the second output optical fiber 3 by (s-δ)/2. With the structure in which optical fibers are arranged as such, the isolating function can be combined with the optical multiplexing function.

Since the optical isolator of the third embodiment can use the lens 7, birefringent element 5, compensator 6, magneto-optical element 8, and reflecting mirror 10A in common with the first embodiment, it can expect a reduction in price as well as miniaturization. Moreover, the optical multiplexing function can be added to the function performed by the first embodiment by simply adding the polarization-maintaining optical fiber and the wavelength selecting filter 12.

Figure 12:
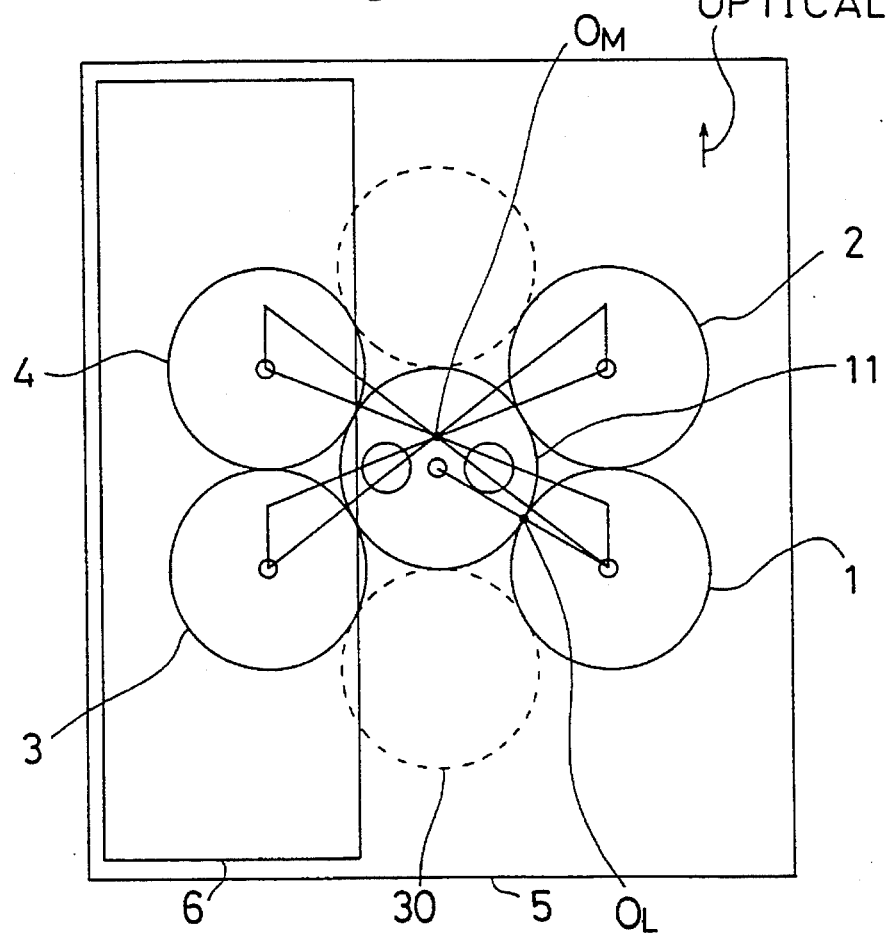
FIG. 12 is a view showing another example of the arrangement in the optical fiber array in the optical isolator according to the above third embodiment.

FIG. 12 shows another example of the arrangement of optical fibers in the optical fiber array of the optical isolator 300 according to the above third embodiment.

As shown in FIG. 12, seven optical fibers including two pairs of input and output optical fibers, two dummy optical fibers 30, and the polarization-maintaining optical fiber 11 are arranged close to each other so that they form a hexagon in cross section. In the arrangement, the polarization-maintaining optical fiber 11 is placed in center, while the two dummy optical fibers 30 are aligned on both sides thereof. Each input optical fiber and its corresponding output optical fiber are diagonally positioned with the polarization-maintaining optical fiber 11 and the two dummy optical fibers 30 interposed therebetween. In this case, the compensator 6 is placed only in the optical paths of the first and second output optical fibers 4 and 3. With the arrangement, the distance between the center of the lens and each of the optical fibers to be connected can be reduced, so that the influence on the aberration of the lens can be reduced. Moreover, since the optical fibers are easily brought into contact with each other, they can be arranged with an improved accuracy, thereby reducing a loss at connections.

Figure 13:
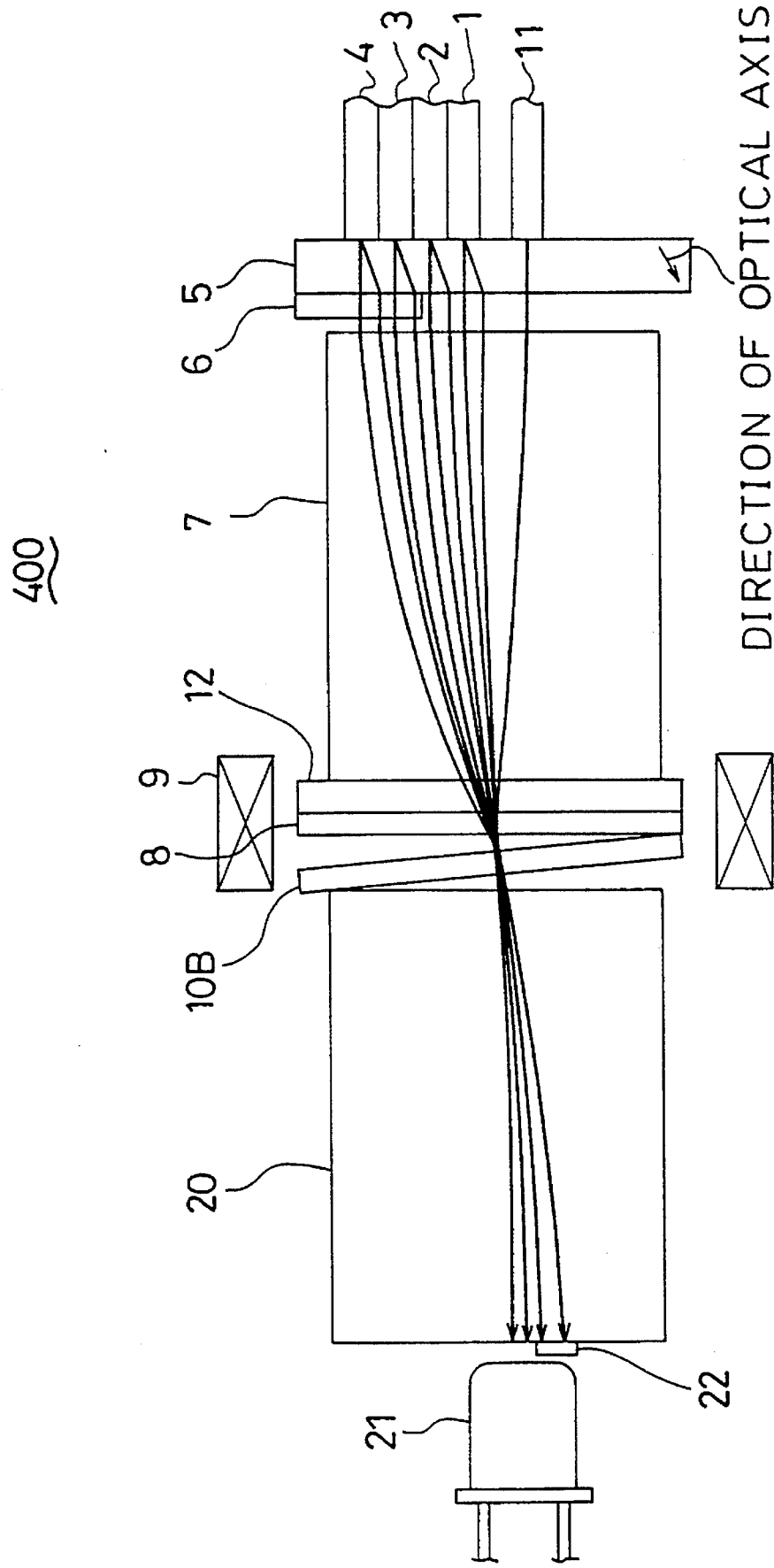
FIG. 13 is a view showing optical paths through the center axes of optical fibers in the optical isolator according to a fourth embodiment.

Below, an optical isolator 400 according to a fourth embodiment of the present invention will be described with reference to FIG. 13. The optical isolator 400 of the fourth embodiment was obtained by adding the optical multiplexer and a monitoring function to the main body of an optical isolator. In other words, the fourth embodiment has the structure of the second embodiment and the structure of the third embodiment in combination. Therefore, the description of like components will be omitted by providing like reference numerals.

Below, a description will be given to the operation of the optical isolator 400 of the fourth embodiment.

The incident light from the polarization-maintaining optical fiber 11, which is linearly polarized light at a wavelength of $\lambda_1$, is transmitted by the birefringent element 5 and by tile lens 7 so that it is incident upon the wavelength selecting filter 12. The light is then reflected by the wavelength selecting filter 12 and coupled to the first input optical fiber 1 which is at the symmetrical position with the polarization-maintaining optical fiber 11 around the center of the lens 7.

The incident light from the first and second input optical fibers 1 and 2 at a wavelength of $\lambda_2$, which has random polarized components, is resolved by the birefringent element 5 into an ordinary-ray component and an extraordinary-ray component which are linearly polarized rays at right angles to each other. After that, the components are transmitted by the lens 7 and by the wave-length selecting filter 12 so as to reach the reflecting mirror 10B, which reflects about 99% of the rays. The reflected rays are coupled to the first and second output optical fibers 4 and 3. Of 1% of the rays transmitted by the reflecting mirror 10B, that incident ray from the second input optical fiber 2 is intercepted by the black absorber 22 provided on the condenser lens 20, so that the incident ray from the first input optical fiber 1 is solely coupled to the semiconductor light-receiving element 21.

With the structure described above, a miniaturized optical isolator with the two optical isolating functions, optical multiplexing function, and monitoring function can be implemented.

Below, an optical isolator 500 according to a fifth embodiment of the present invention will be described with reference to FIG. 14.

The optical isolator 500 of the fifth embodiment was obtained by incorporating two optical multiplexers into the main body of an optical isolator. The structure of the present embodiment is different from the structure of the third embodiment in that a second polarization-maintaining optical fiber 11 is provided in addition to the first polarization-maintaining optical fiber 11 and that two compensators 6 are provided between the birefringent element 5 and the lens 7. As for other components, they are the same as those of the optical isolator 300 of the first embodiment, so that the description thereof will be omitted by providing like components with like reference numerals.

FIG. 15 shows the arrangement of optical fibers in the optical fiber array of the optical isolator 500 of the above fifth embodiment.

As shown in FIG. 15, the second polarization-maintaining optical fiber 13 is positioned in abutment with the first and second input optical fibers 1 and 2, which are arranged similarly to the third embodiment. A connecting line segment between the first input optical fiber 1 and the first polarization-maintaining optical fiber 11 and a connecting line segment between the second output optical fiber 3 and the second polarization-maintaining optical fiber 13 are positioned so as to intersect each other at midpoints. The two compensators 6 are provided in the optical paths of the first and second output optical fibers 4 and 3 and in the optical path of the second polarization-maintaining optical fiber 13.

Below, a description will be given to the operation of the optical isolator 500 according to the fifth embodiment.

The incident rays of light from the first and second polarization-maintaining optical fibers 11 and 13, which are linearly polarized rays at a wavelength of $\lambda_1$, function as ordinary rays with respect to the birefringent element 5 and reflected by the wavelength selecting filter 12. The reflected rays are coupled to the first and second input optical fibers 1 and 3 at the symmetrical positions with respect to the center of the lens 7. In this case, since the plane of polarization of the ray incident upon the second output optical fiber 3 is rotated 45 degrees by the compensator 6 provided in the optical path of the second output optical fiber 3, the plane of polarization of the ray emitted from the second polarization-maintaining optical fiber 13 is preliminarily rotated 45 degrees in the reverse direction by the compensator 6 provided on the emitting end of the second polarization-maintaining optical fiber 18.

The incident light from the first and second input optical fibers 1 and 2 at a wavelength of $80_2$ is resolved by the birefringent element 5 into an ordinary-ray component and an extraordinary-ray component, which are linearly polarized rays at right angles to each other. After that, the resulting components are transmitted by the lens 7 and by the wavelength selecting filter 12, so as to reach the reflecting mirror 10A. The rays reflected by the reflecting mirror 10A are coupled to the first arid second output optical fibers 4 and 3, similarly to the first embodiment.

In the arrangement of the optical fibers, if an amplifying optical fiber (not shown) is connected between the first input optical fiber 1 and the second output optical fiber 8, the first polarization-maintaining optical fiber 11 can be used for backward excitation, while the second polarization-maintaining optical fiber 13 can be used for forward excitation. Accordingly, an optical isolator for use in a bidirectional optical fiber amplifier, which has the optical multiplexing function in combination with the optical isolating function, can be implemented by the fifth embodiment.

It will be appreciated that the optical isolator with the monitoring function can also be constituted by using the semiconductor light-receiving element 21, similarly to the second embodiment, although the drawing thereof is omitted here.

Below, the builtup structure and manufacturing method of the optical isolator 300 of the third embodiment will be described with reference to FIGS. 16 to 23.

First, a description will be given to the principle of adjusting the angle of the reflecting mirror 10A, which is characteristic of the present built-up structure, with reference to FIGS. 16(a) and 16(b). In the drawings, a reference numeral 10A designates a reflecting mirror in which the optical path of the incident light can be changed by changing the angle of the reflecting surface, so that the reflected light therefrom can have a different optical path. The reflecting mirror 10A is fixed to a first rotation axis 51 which is tilted at a specified angle α from the normal line 50 to the reflecting surface. The first rotation axis 51 is rotatably held by a second rotation axis 52 which is coaxial with the normal line 50 to the reflecting mirror 10A. In other words, the second rotation axis 52 is tilted in the opposite direction at a specified angle α from the first rotation axis 51. Consequently, if the first rotation axis 51 is rotated, the normal line 50 to the reflecting mirror 10A shifts along the generating line of a virtual cone with a vertical angle of 2α. The shift of the normal line 50 indicates that, if the first rotation axis 51 is rotated halfway, the angle between the normal line 50 to the reflecting mirror 10A and the second rotation axis 52 continuously varies from 0 to 2α.

Figure 16A:
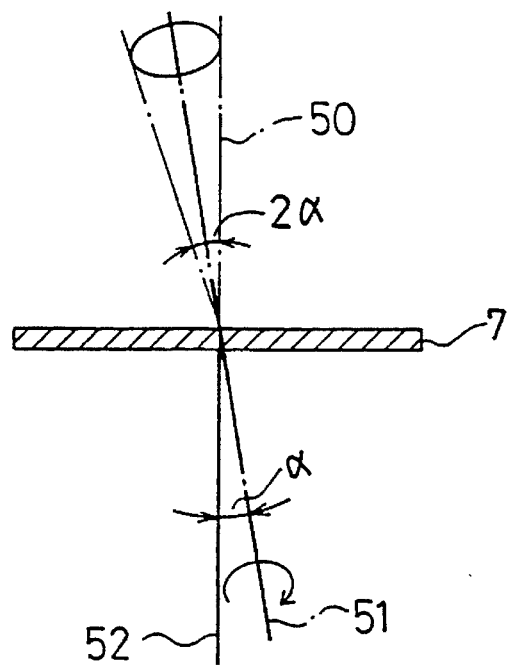
FIGS. 16(*a*) and 16(*b*) are views illustrating the principle adjusting the angle of a reflecting mirror in the optical isolator according to the above third embodiment.
Figure 16B:
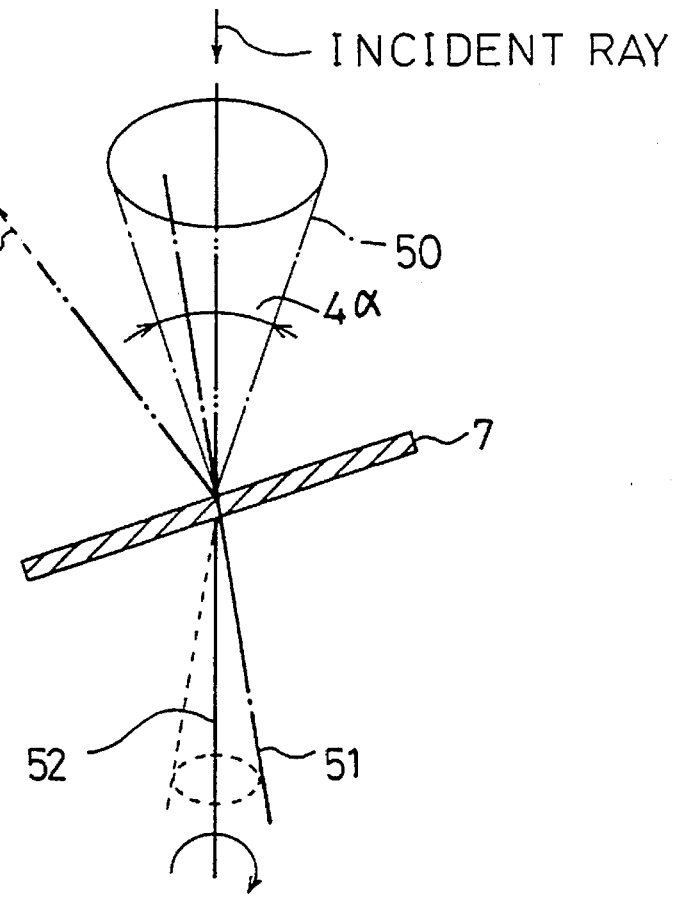

FIG. 16(b) shows the position of the reflecting mirror 10A when the first rotation axis 51 has been rotated 180 degrees from the position shown in FIG. 16(a). From this position, if the second rotation axis 52 is allowed to make a full turn, the normal line 50 to the reflecting mirror 10A shifts along the generating line of a vertical cone having a vertical angle of $4\alpha$. In this case, although the first rotation axis 51 shifts in tandem with the rotation of the second rotation axis 52, the second rotation axis 52 does not shift in tandem with the rotation of the first rotation axis 51. From the foregoing description, it will be appreciated that the normal line 50 to the reflecting mirror 10A can be tilted in all directions at an angle of 0 to $2\alpha$ toward the second rotation axis 52.

Figure 17:
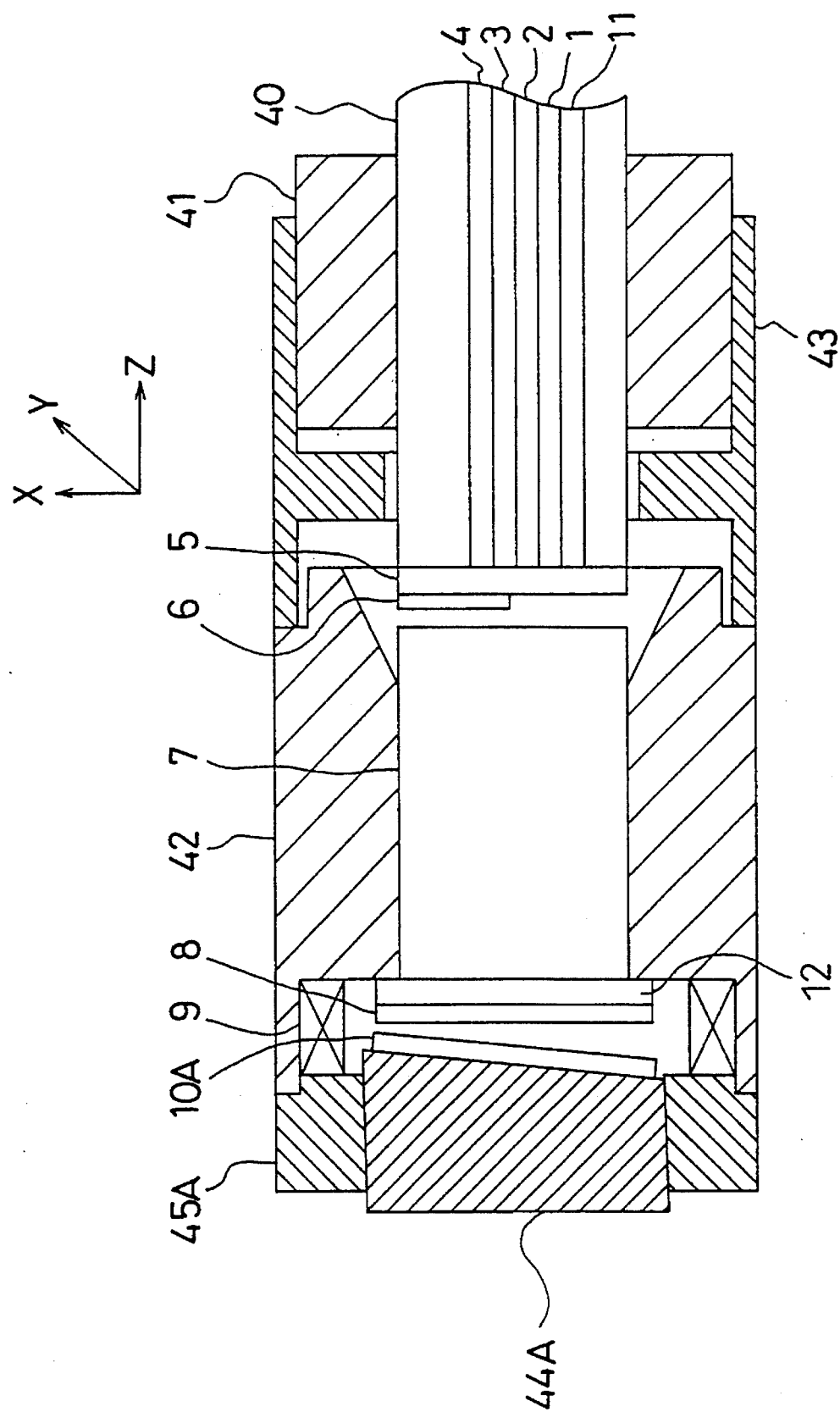
FIG. 17 is a cross-sectional view showing the built-up structure of the optical isolator according to the above third embodiment.

Next, a description will be given to the built-up structure of the optical isolator 300 of the third embodiment, which was constituted in accordance with the foregoing principle. In FIG. 17, the description of the same components as those used in FIG. 10 will be omitted by providing like reference numerals.

As shown in FIG. 17, the optical fiber array 40, which is fixed to an array holder 41 serving as a first holder, consists of the first and second input optical Fibers 1 and 2, first and second output optical fibers 4 and 8, and polarization-maintaining optical fiber 11, which are aligned with respect to each other. To one end of the optical fiber array 40 is fixed the birefringent element 5, so that its optical axis extends in the same direction as the five optical fibers 1 to 4 and 11 constituting the optical fiber array 40 extend. To the end face of the birefringent element 5 is attached the compensator 6, so as to intercept the optical paths of the first and second output optical fibers 4 and 8.

To the end face of the lens 7 which does not face the optical fiber array 40 is fixed the wavelength selecting filter 12 and magneto-optical element 8 by means of an optical adhesive with excellent transmittance. The lens 7 is fixed onto the inner circumferential surface of a cylindrical lens holder 42 made of metal, which serves as a second holder. To the lens holder 42 is attached the permanent magnet 9 for applying a magnetic field to the magneto-optical element 8. After the distance between the lens 7 and the optical fiber array 40 and the optical axis were adjusted, an adjusting sleeve 43, serving as a member for adjusting the distance, is fixed to the lens holder 42 and to the array holder 41 by the application of a laser beam.

The reflecting mirror 10A is fixed to a first cylindrical holding member 44A so that it is tilted with respect to the axis of the first holding member 44A. A second cylindrical holding member 45A, which is coaxial with the lens holder 42, is provided so that it is tilted with respect to the axis of the first holding member 44A. The first holding member 44A is fitted into the inner circumferential surface of the second cylindrical holding member 45A with high precision, so that either of the holding members can rotate in relation to the other. In this manner, the second holding member 45A can rotate around the optical axis of the lens 7, while the first holding member 44A can rotate in a tilted position with respect to the optical axis of the lens 7. The first holding member 44A and second holding member 45A are rotated by specified degrees, so as to optimize the angle between the reflecting mirror 10A and the optical axis of the lens 7. Thereafter, the second holding member 45A is fixed to the lens holder 42 and to the first holding member 44A by spot welding with YAG laser.

In this case, since the center of the reflecting surface of the reflecting mirror 10A falls at the intersection of the rotation axis of the first holding member 44A and the rotation axis of the second holding member 45A, the center of the reflecting surface of the reflecting mirror 10A does not shift even when the first and second holding members 44A and 45A rotate, so that the reflecting surface does not shift in the axial direction.

The array holder 41, lens holder 42, first holding member 44A, and second holding member 45A are preferably composed of a metal having a small expansion coefficient, such as a nickel-iron alloy having an expansion coefficient of $(1.2 \times 10^{-6})$, which prevents the deterioration of the coupling efficiency due to variations in temperature.

Next, a description will be given to a method of manufacturing the optical isolator thus constituted.

First, the directions of an X axis, a Y axis, and a Z axis are adjusted so that incident light at a wavelength of $\lambda 1$ from the polarization-maintaining optical fiber 11, which is connected to an excitention light source (not shown), is optimumly coupled to the first input optical fiber 1 (the directions of the X, Y, and Z axes are indicated by the arrows in FIG. 17). After the above adjustment was achieved, the direction of the Z axis is fixed by welding the array holder 41 and adjusting sleeve 43 together with YAG laser. Then, the directions of the X and Y axes are adjusted again and the adjusting sleeve 43 and lens holder 42 are fixed by welding with YAG laser thereafter.

Next, signal light at a wavelength of $\lambda 2$ is made incident from the first input optical fiber 1 and an adjustment is made by rotating the first holding member 44A and the second holding member 45A so that the optical output From the first output optical fiber 4 is maximized. After the adjustment was made, the first holding element 44A and second holding element 45A are fixed to each other by welding with YAG laser.

Below, a description will be given to a method of adjusting the angle of the reflecting mirror 10A in the optical isolator thus constituted.

Figure 18A:
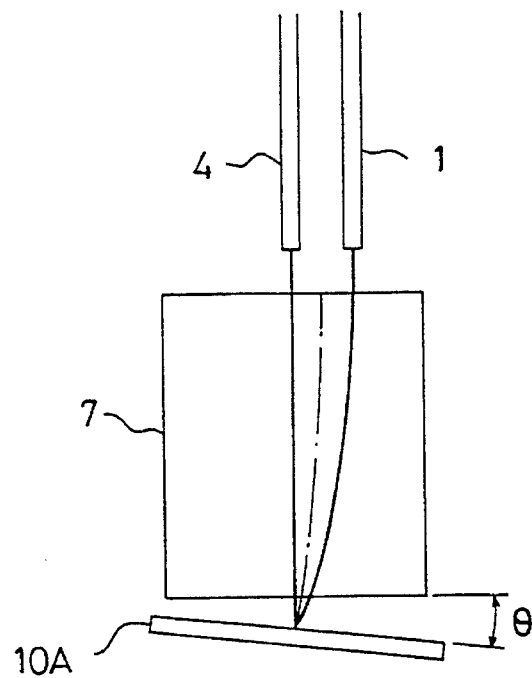
FIGS. 18(*a*) and 18(*b*) are views illustrating the relationship between the angle of the reflecting mirror and the positions of the optical fibers in the optical isolator according to the above third embodiment.
Figure 18B:
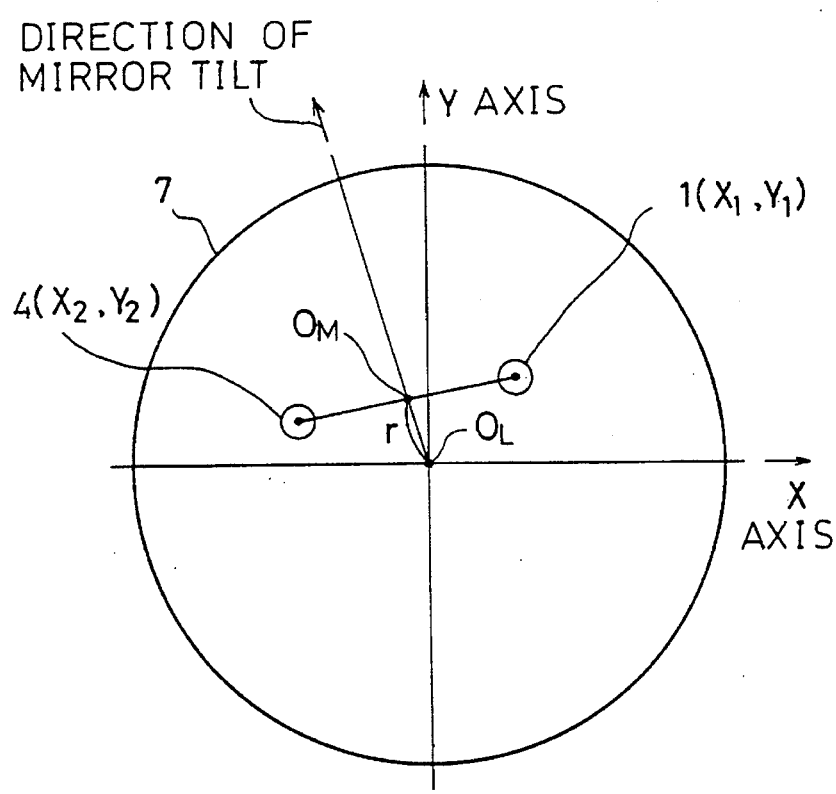

First, a positional relationship on the end of the lens 7 between optical fibers to be connected in a reflection-type coupling system using the converging rod lens 7 and the angle between the reflecting mirror 10A and the optical axis of the lens 7 will be described with reference to FIGS. 18(a) and 18(b). FIG. 18(a) shows the structure viewed from one side of the reflection-type coupling system and FIG. 18(b) shows the end face of the lens 7 facing the optical fibers in the reflection-type coupling system.

Here, a description will be given to the case where, between two optical fibers, coupling is achieved from the input optical fiber 1 placed in an arbitrary position with respect to the lens 7 to the output optical fiber 4.

When an X coordinate axis and Y coordinate axis, which intersect at right angles to each other at the center of the optical axis $0_L$ serving as an origin, are given in arbitrary directions, the positions of the input and output optical fibers 1 and 4 are represented by coordinates $(X_1, Y_1)$ and $(X_2, Y_2)$, respectively. According to the coupling principle of the lens 7, in order to provide coupling between the input optical fiber 1 and the output optical fiber 4, the optical center $0_M$ of the reflecting mirror 10A should be at the midpoint of a connecting line between the center of the input optical fiber 1 and the center of the output optical fiber 4 on the end face of the lens 7. The reflecting mirror 10A is tilted in the direction in which the center of the optical axis $0_L$ of the lens 7 and the optical center $0_M$ of the reflecting mirror 10A are connected. Here, it is defined that the optical center $0_M$ of the reflecting mirror 10A is a point from which the light incident upon the lens 7 is emitted in the direction of the normal to the reflecting surface of the reflecting mirror 10A. Since the light incident upon the lens 7 from the optical center $0_M$ of the reflecting mirror 10A is vertically incident upon the reflecting mirror 10A, it is coupled to the optical center $0_M$ of the reflecting mirror 10A by following the same optical path backward. Consequently, the input optical fiber 1 and output optical fiber 4, which are symmetric with respect to the optical center $0_M$ of the reflecting mirror 10A, are eventually connected to each other.

In view of the foregoing, it will be appreciated that, to connect the input optical fiber 1 with the output optical fiber 4, it is sufficient to set the angle of the reflecting mirror 10A so that the optical center $0_M$ of the reflecting mirror 10A falls on the normal to the reflecting mirror 10A. The distance r between the center $0_L$ of the optical axis of the lens 7 and the optical center $0_M$ of the reflecting mirror 10A and the ankle $\theta$ of the reflecting mirror 10A for connecting the input optical fiber 1 with the output optical fiber 4 are given by the following equations, on the assumption that the refractive index of the medium between the lens 7 and the reflecting mirror 10A is 1.

$$r = [\{(X_1+X_2)^2 + \{(Y_1+Y_2)/2\}^2\}]^{1/2}$$

$$\theta = -n_0 \cdot g \cdot \sin(gZ) \cdot r$$

where $n_0$ is the refractive index in the center axis of the lens 7, g is the refractive index distribution constant of the lens 7, and Z is the length of the lens 7.

For example, if the positions of the input optical fiber 1 and output optical fiber 4 are: $X_1=125$ μm, $X_2=250$ μm, $Y_1=Y_2=0$, the refractive index on the center axis of the lens 7 is $n_0=1.59$, refractive index distribution constant is: g=0.294, and the length of the lens 7 is: Z=5.8 mm, the angle $\theta$ the reflecting mirror 10A derived from the following equations becomes about 1.67 degrees. The orientation of the reflecting mirror 10A tilted with respect to the optical axis of the lens 7 is in the direction of the X axis. As described above, since the adjustment of the tilt angle the reflecting mirror 10A in the reflection-type coupling system is equivalent to the adjustment of the position of the optical center $0_M$, the adjustment of the optical center $0_M$ of the reflecting mirror 10A will be described below instead.

Below, the locus of the position of the optical center $0_M$ which is produced when the position of the optical center $0_M$ of the reflecting mirror 10A is varied in accordance with the above principle of angle adjustment will be described with reference to FIGS. 19(*a*), 19(*b*), and 19(*c*).

FIGS. 19(*a*), 19(*b*), and 19(*c*) show different ranges within which the optical center $0_M$ can be set depending on the relationship in terms of magnitude between an angle β1 at which the rotation center of the reflecting mirror 10A is tilted with respect to the optical axis of the lens 7 and an angle β2 at which the reflecting surface of the reflecting mirror 10A is tilted with respect to a surface at right angles to the rotation axis of the reflecting mirror 10A. In the drawings, the views on the left show the loci of the optical center $0_M$ and the views on the right show the movement of the normal to the reflecting mirror 10A. The outer circles on the left views indicate the loci of the optical center $0_M$ when the reflecting mirror 10A tilted at the maximum angle with respect to the optical axis of the lens 7 made a full turn around the optical axis of the lens 7. The substantially circular figures inscribed in the outer circles indicate the loci of the optical center $0_M$ when the reflecting mirror 10A tilted at the maximum angle with respect to the optical axis of the lens 7 made a full turn around the center thereof.

The ranges within which the position of the optical center $0_M$ can be set depending on the relationship in terms of magnitude between the above angles β1 and β2 are shown below.

(1) If β1=β2, as shown in FIG. 19(*a*), the locus of the optical center $0_M$ produced by the rotation of the first holding member 44A passes through the center $0_L$ of the optical axis of the lens 7, so that the optical center $0_M$ can be set at any point on the circumference of the outer circle when each point on the perimeter of the substantially circular inscribed locus achieves a full turn while being kept in contact with the outer circle, i.e., any point inside the outer circle. Therefore, the range within which the optical center $0_M$ can be set is the inside of the outer circle.

(2) If β1>β2, as shown in FIG. 19(*b*), the locus of the optical center $0_M$ produced by the rotation of the first holding member 44A does not pass through the center $0_L$ of the optical axis of the lens 7, so that the optical center $0_M$ can not be set in the hatched region in the drawing. Therefore, the range within which the optical center $0_M$ can be set is the inside of the outer circle except for the hatched region.

(3) If β1<β2, as shown in FIG. 19(*c*), the locus of the optical center $0_M$ produced by the rotation of the first holding member 44A does not pass through the center $0_L$ of the optical axis of the lens 7, similarly to FIG. 19(*b*), so that the optical center $0_M$ cannot be set in the hatched region in the drawing. Therefore, the range within which the optical center $0_M$ can be set is the inside of the outer circle except for the hatched region.

Since the loci of the optical center $0_M$ are produced as described above, in order to obtain the optimum optical center $0_M$ by rotating the first holding member 44A and second holding member 45A, it is necessary to control the rotation of the first and second holding members 44A and 4SA so as to maximize the output from the output optical fiber 4 to be connected.

Although the description has been given to the case where the center axis of the lens 7 and the center axis of the rotation of the second holding member 45A are in the same direction, even when the above two center axes are tilted, the optical center $0_M$ can also be set likewise, except that the range within which the optical center $0_M$ can be set falls in the inside of a circle in which its center has been shifted in relation to tile center of the lens 7.

Figure 20:
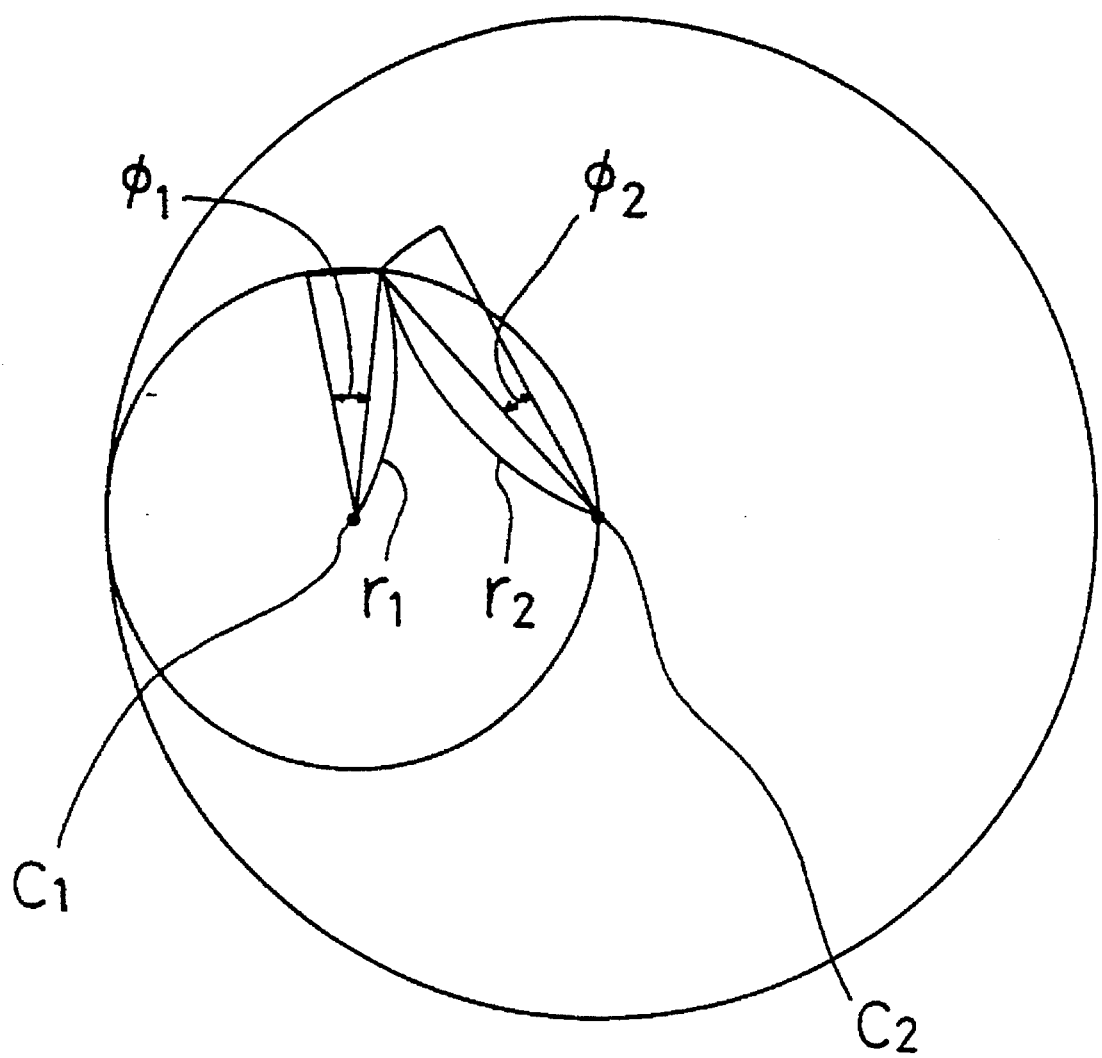
FIG. 20 is a view illustrating the shift of the optical center due to the rotation deviation of the angle adjusting elements in the optical isolator according to the above third embodiment.
Figure 21:
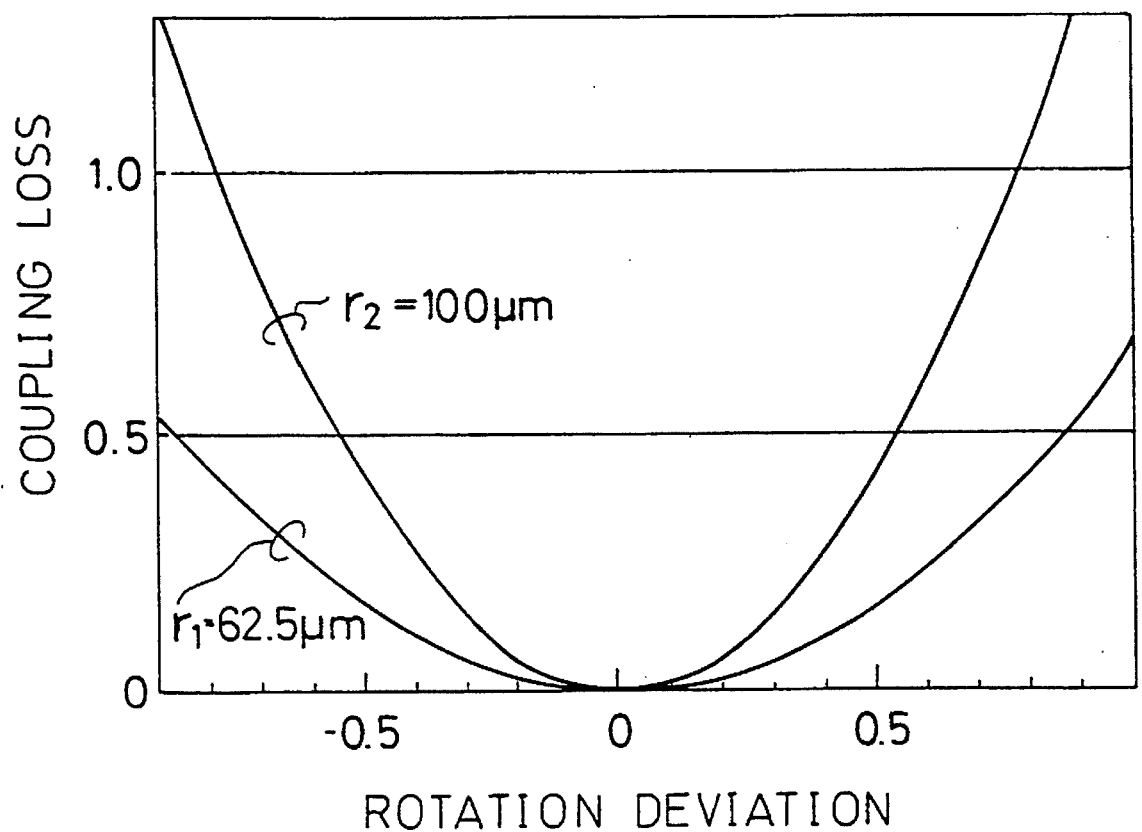
FIG. 21 is a view illustrating the relationship between the rotation deviation of the angle adjusting elements and a coupling loss in the optical isolator according to the above third embodiment.

FIG. 20 shows different deviations of the optical center $0_M$ from the optimum optical center $0_M$ which are caused when each the first and second holding members 44A and 45A undergoes a rotation deviation. FIG. 21 shows an example of the deterioration of coupling efficiency due to the deviations of the optical center $0_M$ from the optimum position. In FIG. 20, reference numerals $C_1$ and $C_2$ designate the centers of the rotation of the first and second holding members 44A and 45A, respectively.

FIG. 20, if the radius of the substantially circular locus of the optical center $0_M$ which shifts with the rotation of the first holding member 44A is $r_1$ and the amount of rotation deviation from tile optimum position is φ1, the amount of displacements of the connecting axes of optical fibers is approximately represented by $4r_1 \cdot \sin(\phi_1/2)$. Likewise, if the radius of the locus of the optical center $0_M$ which shifts with the rotation of the second holding member 45A is $r_2$ and the amount of rotation deviation from the optimum position is φ2, the amount of displacements of the connecting axes of optical fibers is represented by $4r_2 \cdot \sin(\phi_2/2)$.

For example, in connecting single-mode optical fibers, if the rotation deviations and coupling losses are calculated when the radius $r_1$ of the locus of the optical center $0_M$ produced by the first holding member 44A is 62.5 μm and the radius $r_2$ of the locus of the optical center $0_M$ produced by the rotation of the second holding member 45A is 100 μm, the characteristic curves shown in FIG. 21 are obtained.

It will be appreciated from the drawing that, to suppress the increase of the coupling loss to 0.5 dB or lower, it is sufficient to set the accuracy with which the first holding member 44A is rotated to 0.8 degrees or less and to set the rotation accuracy with which the second holding member 45A is rotated to 0.5 degrees or less. Compared with the angle at which the reflecting mirror 10A is tilted to the optical axis of the lens 7, each of these rotation accuracies is lowered by one order of magnitude or more.

From the FIGS. 20 and 21, it will be appreciated that, as the radius of the locus of the optical center $0_M$ becomes smaller, the influence of the rotation deviation from the optimum position on the coupling loss is reduced accordingly.

Since the positions of the optical fibers to be connected are determined in designing the optical fiber array, the distance between the center of the lens 7 and the optical center $0_M$ of the reflecting mirror 10A can be calculated in advance. Consequently, the loss increase due to the rotation deviation can be prevented by setting, in consideration of the accuracy with which optical fiber are arranged in the optical fiber array and of the accuracy with which the member is obliquely processed, the tilt angle of the first holding member 44A so that $\beta1 > \beta2$ is satisfied, thereby reducing the size of the substantial circular locus of the optical center $0_M$ produced by the rotation of the first holding member 44A.

Figure 22A:
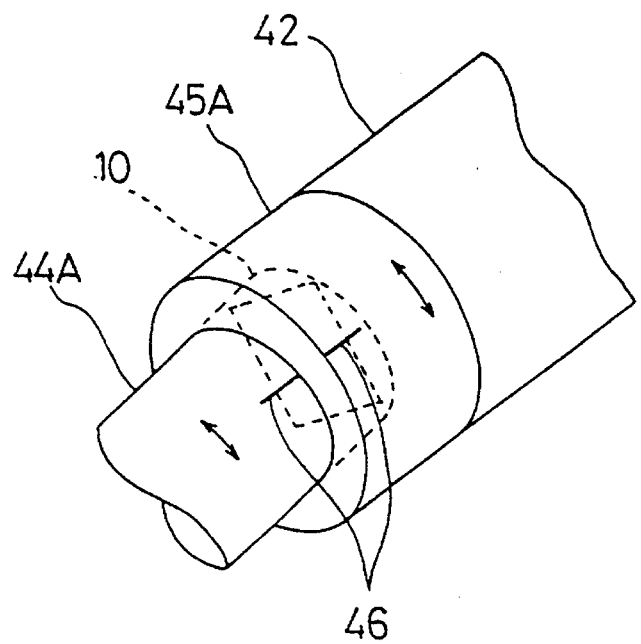
FIGS. 22(*a*) and 22(*b*) are views illustrating a method of angle adjustment by means of marks provided on the angle adjusting elements in the optical isolator of the above third embodiment.
Figure 22B:
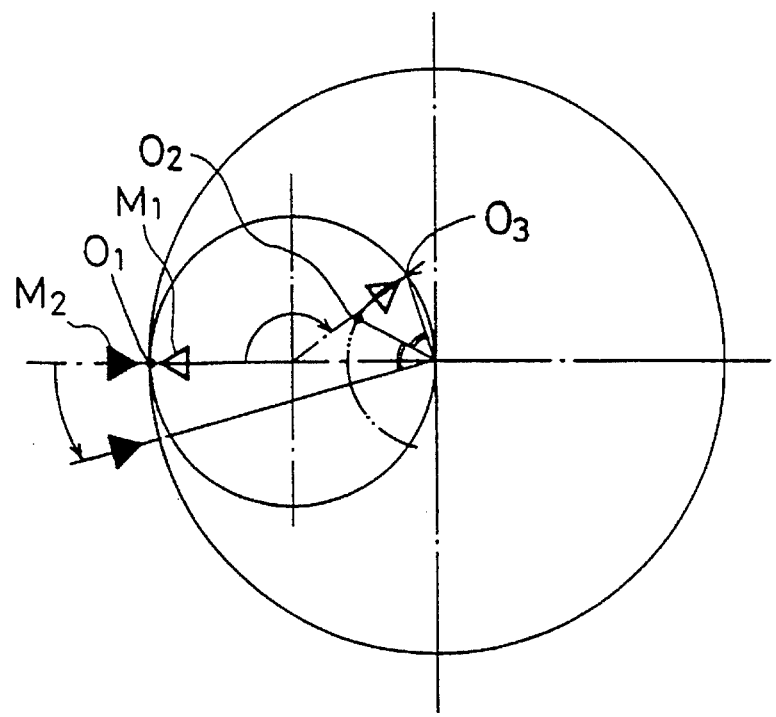
Figure 24:
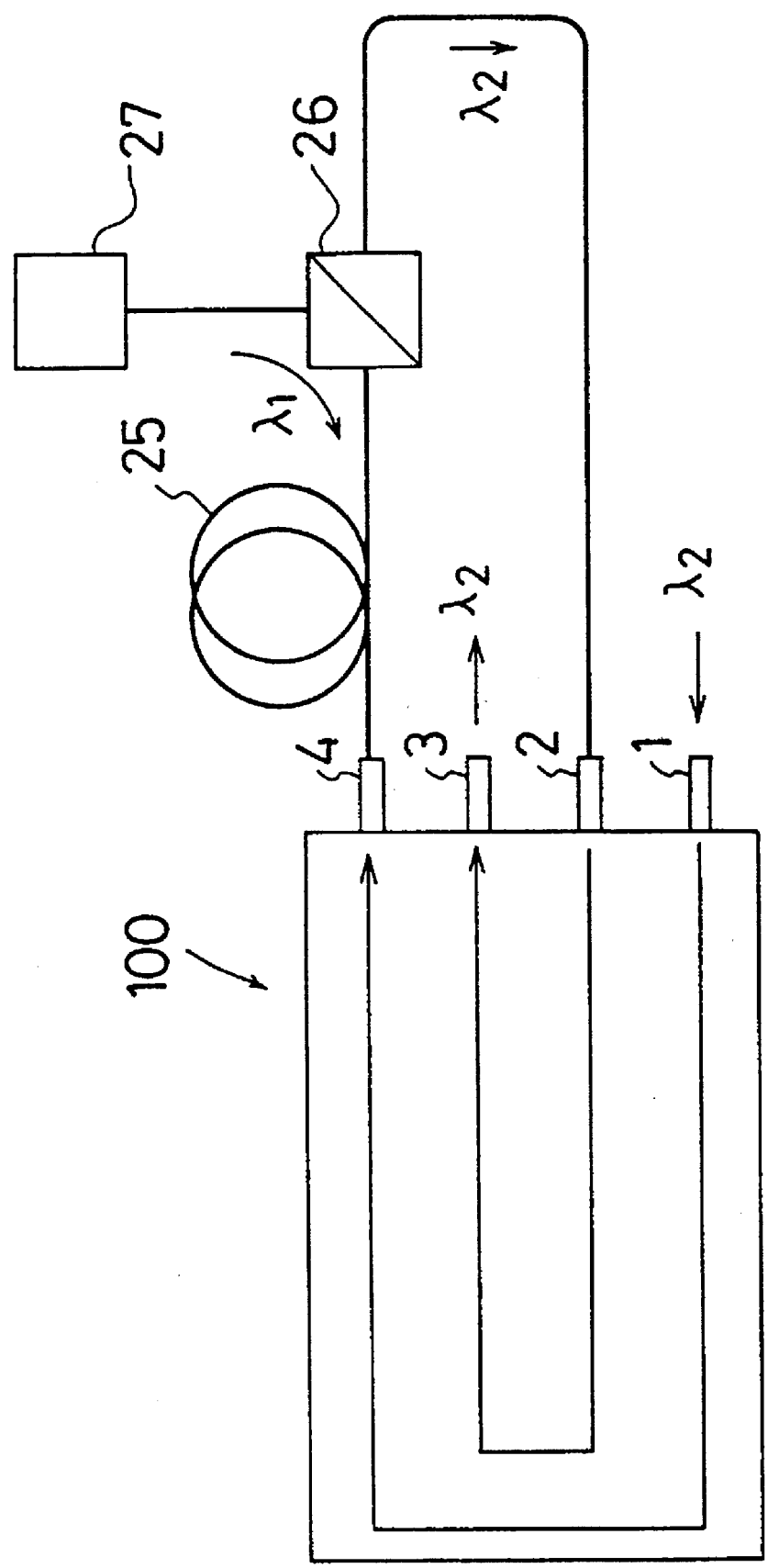
FIG. 24 is a view showing the structure of an optical fiber amplifier to which the optical isolator according to the above first embodiment is applied.

FIG. 22(a) shows a pair of markings 46 attached to the first holding member 44A and to the second holding member 45A and FIG. 22(b) shows the locus of the optical center $0_M$ of the reflecting mirror 10A with the shifting of the markings 46.

FIG. 22(b), the outer circle shows the shift of the optical center $0_M$ produced by the rotation of the second holding member 45A and the substantial circular figure shows the locus of the optical center $0_M$ produced by the rotation of the first holding member 44A. As shown in FIG. 22(b), the optical center $0_M$ is set to the initial position $0_1$ on the left side of the outer circle when the two markings 46 match. Since the positional relationship between the center $0_l$ of the optical axis of the lens 7 and the optical fibers to be connected was obtained previously, the distance between the center $0_L$ of the optical axis of the lens 7 and the optical center $0_M$ of the reflecting mirror 10A can easily be calculated. Subsequently, the intersection $0_3$ of the locus of the distance and the locus of the optical center $0_M$ produced by the rotation of the first holding member 44A is obtained, followed by the rotation of the first holding member 44A till the marking 46 on the first holding member 44A comes to the intersection $0_3$. After that, the second holding member 45A is rotated by a degree whereby the intersection $0_3$ comes to the optical center $0_2$, so that the optical center $0_M$ of the reflecting mirror 10A can be set roughly to the specified position $0_2$. With the markings 46, it becomes possible to make a rough adjustment easily, resulting in a reduction in adjusting time.

FIG. 23 shows a variation of the member for adjusting the angle of the reflecting mirror.

The variation is constituted so that the first holding member 44B and the second holding member 45B are brought into contact with each other in a plane at right angles to the rotation axis of the first holding member 44B. Accordingly, if the first holding member 44B is rotated while it is kept in contact with the second holding member 45B in the same plane, the ankle of the reflecting mirror 10A held by the first holding member 44B varies continuously. Therefore, the angle of the reflecting mirror 10A can be changed precisely even when the first holding member 44B is fitted into the second holding member 45B with an inferior accuracy. Moreover, since the first and second holding members 44B and 45B for adjusting the angle are kept in contact with each other in the same plane, an angular misalignment seldom occurs in the fixation with YAG laser.

FIG. 8 shows the structure of an optical fiber amplifier using the optical isolator 100 according to the first embodiment of the present invention.

The first output optical fiber 4 of the optical isolator 100 is connected to one terminal of the EDF 25 serving as an amplification optical fiber. The other end of the EDF 25 is connected to one terminal of the optical multiplexer 26, while another terminal of the optical multiplexer 26 is connected to the second input optical fiber 2. To the other terminal of the optical multiplexer 26 is connected the excitation light source 27, which inputs excitation light to the EDF 25 via the optical multiplexer 26.

In the optical fiber amplifier thus constituted, if signal light is made incident from the first input optical fiber 1 which is open, the amplified signal light is outputted from the second output optical fiber 3 which is open. Thus, with a single optical isolator obtained by combining the optical isolator on the input side of the EDF with the optical isolator on the output side of the EDF, a miniaturized optical fiber amplifier can be constituted at low cost.

Figure 25:
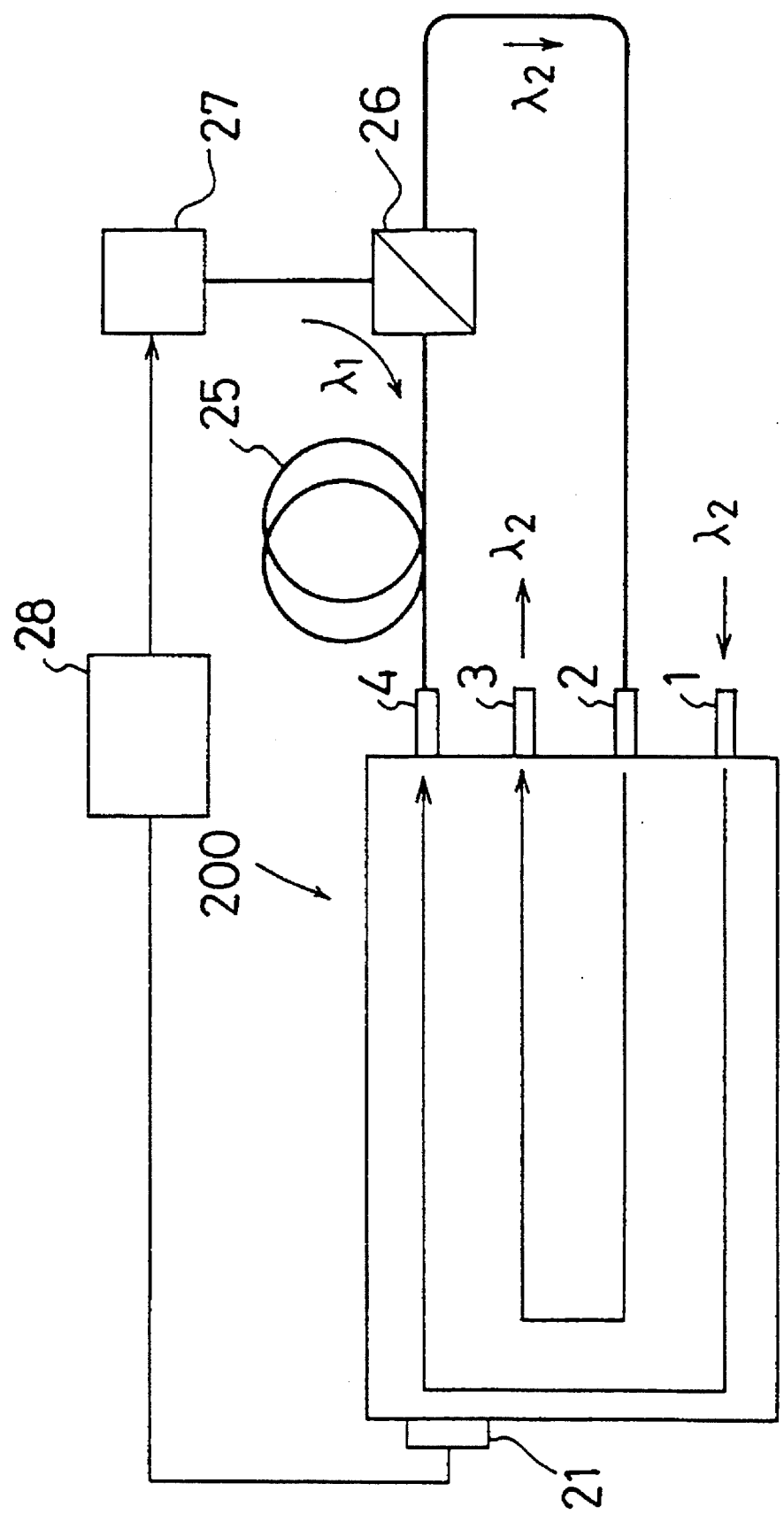
FIG. 25 is a view showing the structure of an optical fiber amplifier to which the optical isolator according to the above second embodiment is applied.

FIG. 25 shows the structure of an optical fiber amplifier using the optical isolator 200 according to the second embodiment of the present invention.

The first output optical fiber 4 of the optical isolator 200 is connected to one terminal of the EDF, while the other terminal of the EDF 25 is connected to one terminal of the optical multiplexer 26. Another terminal of the optical multiplier 26 is connected to the second input optical fiber 2. To the other terminal of the optical multiplexer 26 is connected the excitation light source 27, which inputs excitation light to the EDF 25 via the optical multiplexer 26.

In the optical multiplier thus constituted, if signal light is made incident from the first input optical fiber 1 which is open, the amplified signal light is outputted from the second output optical fiber 3 which is open. At this stage, a part of the amplified signal light is detected by the semiconductor light-receiving element 21. By monitoring the amplified light, the driving circuit 28 controls the output from the excitation light source 27 so that the amplified output remains constant.

Figure 26:
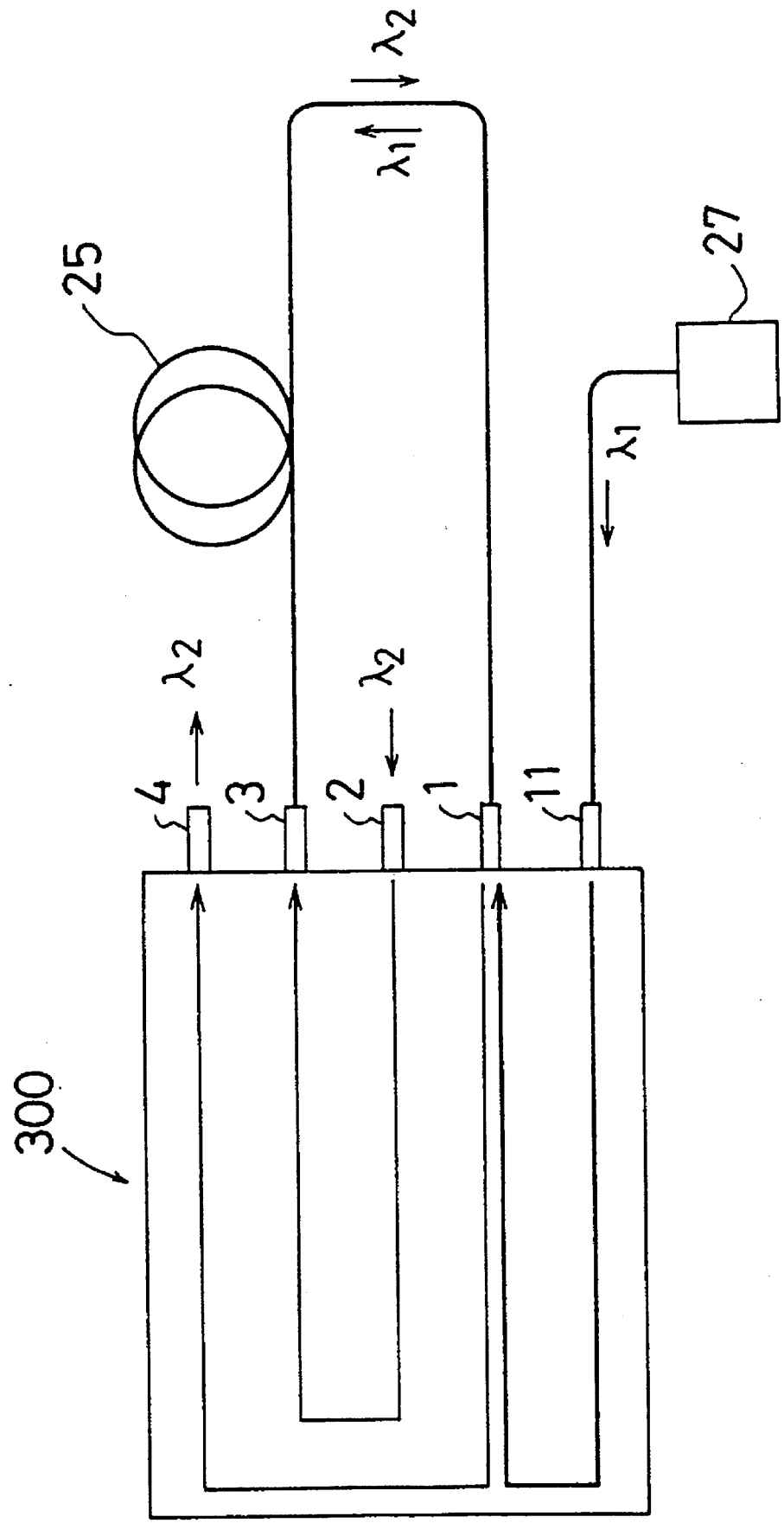
FIG. 26 is a view showing the structure of an optical fiber amplifier to which the optical isolator according to the above third embodiment is applied.

FIG. 26 shows the structure of an optical fiber amplifier using the optical isolator 300 according to the third embodiment of the present invention.

The second output optical fiber 3 of the optical isolator 300 is connected to one terminal of the EDF 25, while the other terminal of the EDF 25 is connected to the first input optical fiber 1. To the polarization-maintaining optical fiber 11 is connected the excitation light source 27 so that the light from the polarization-maintaining optical fiber 11 matches the light from the excitation light source 27 in plane of polarization.

In the optical amplifier thus constituted, if signal light is made incident from the second input optical fiber 2 which is open, the amplified signal light is outputted from the first output optical fiber 4 which is open, thereby implementing a further miniaturized optical fiber amplifier at lower cost. Thus, with a single optical isolator having an optical multiplexing function and the function of two optical isolators combination as shown in the third embodiment, a further miniaturized optical fiber amplifier can be implemented at lower cost.

Figure 27:
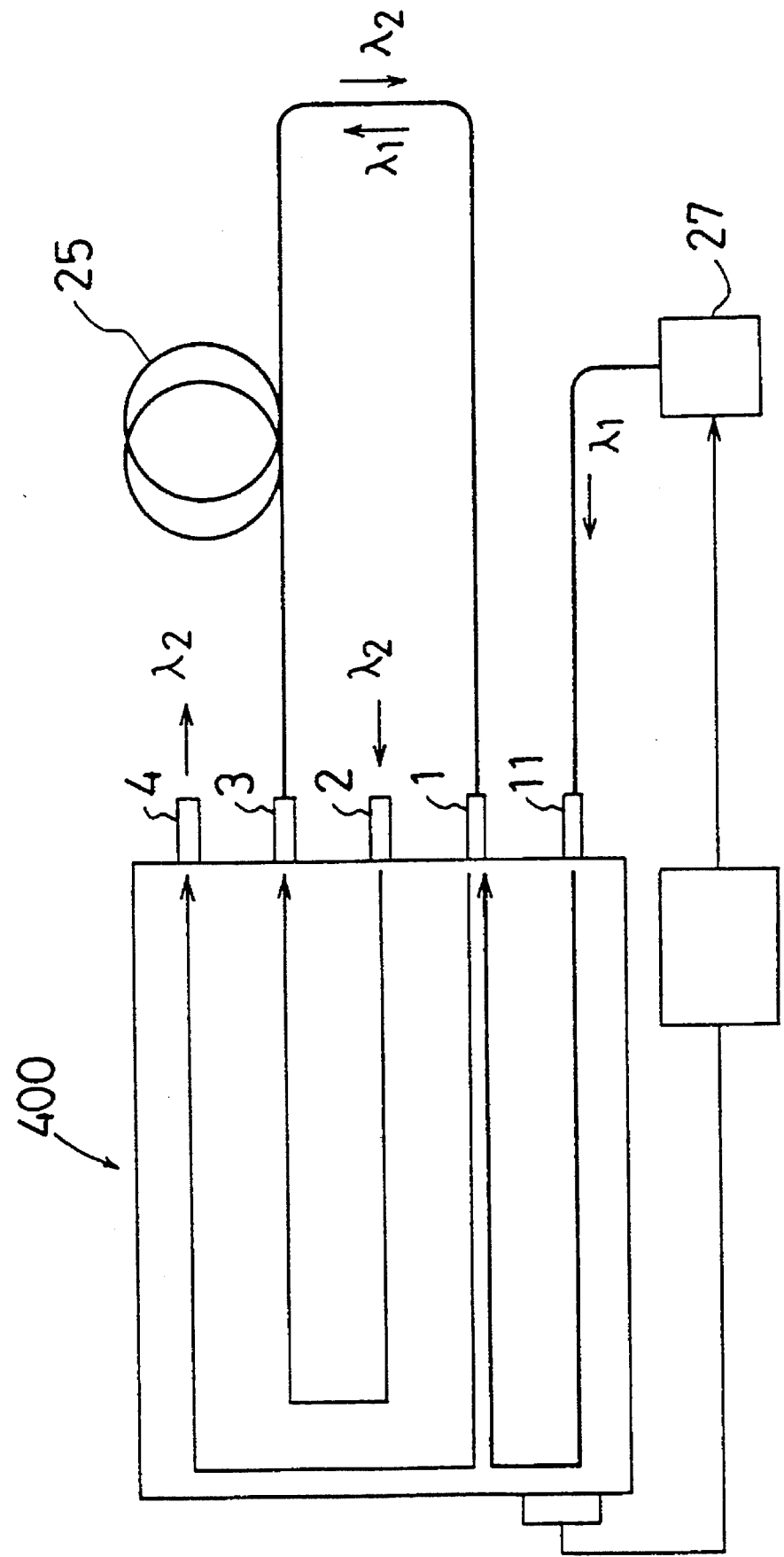
FIG. 27 is a view showing the structure of an optical fiber amplifier to which the optical isolator according to the above fourth embodiment is applied.

FIG. 27 shows the structure of an optical fiber amplifier using the optical isolator 400 according to the fourth embodiment of the present invention.

The second output optical fiber 3 of the optical isolator 400 is connected to one terminal of the EDF 25, while the other terminal of the EDF 25 is connected to the first input optical fiber 1. To the polarization-maintaining optical fiber 11 is connected the excitation light source 27 so that the light from the polarization-maintaining optical fiber 11 matches the light from the excitation light source 27 in plane of polarization.

In the optical multiplier thus constituted, if excited light is inputted from the excitation light source 27, the incident signal light from the second input optical fiber 2 is amplified so that the amplified signal light is outputted from the first output optical fiber 4 which is open. At this stage, a part of the amplified signal light is detected by the semiconductor light-receiving element 21. By monitoring the amplified light, the driving circuit 28 controls the output from the excitation light source 27 so that the amplified output remains constant.

Although the optical fiber amplifiers shown in FIGS. 26 and 27 have adopted the backward excitation system, it is also possible to adopt the forward excitation system instead by reversing the polarity of the permanent magnet 9 in the optical isolators 300 and 400 so as to switch the incident and emergent directions of the first and second input optical fibers 1 and 2 and of the first and second output optical fibers 4 and 3.

Figure 28:
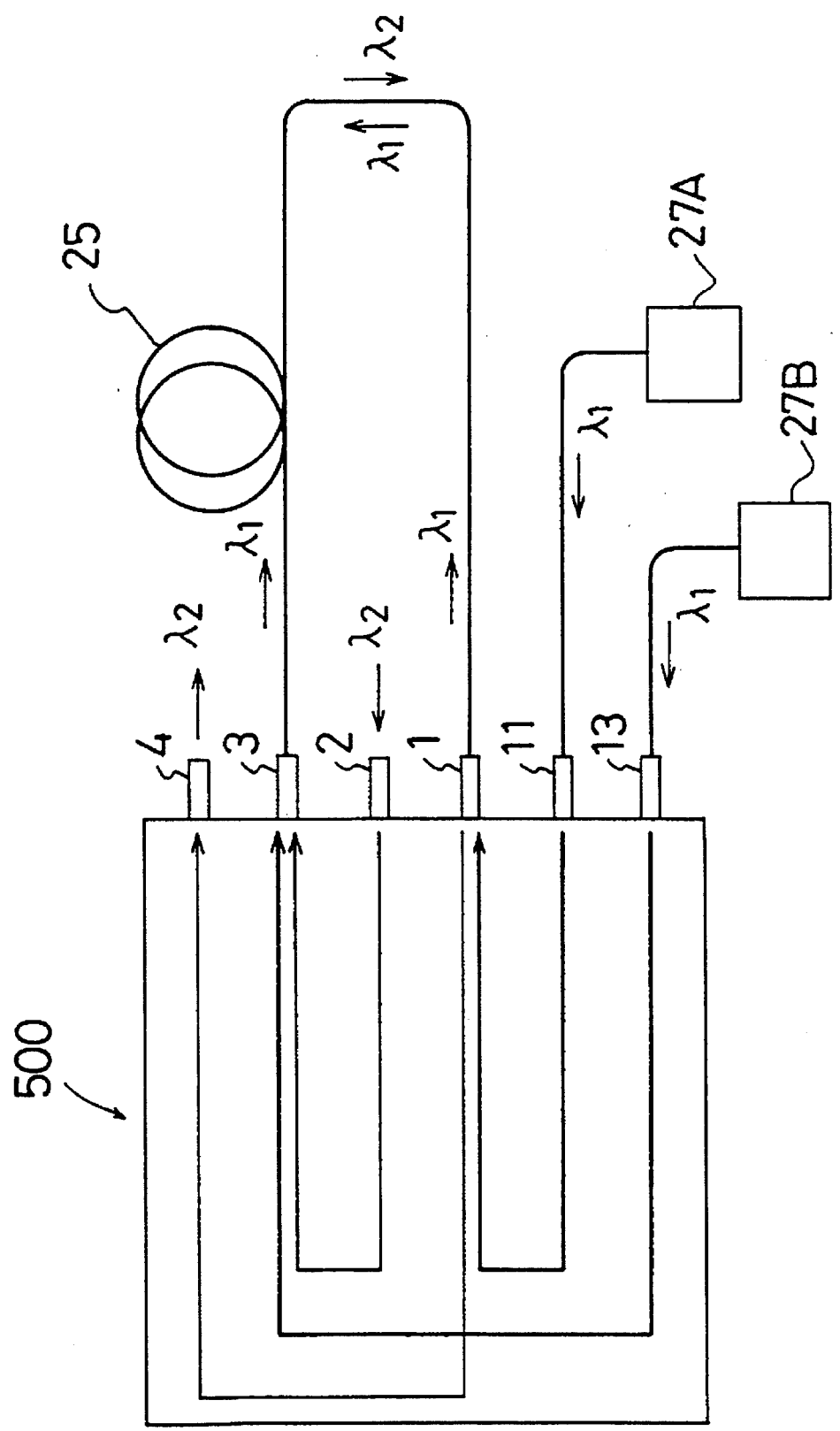
FIG. 28 is a view showing the structure of an optical fiber amplifier to which the optical isolator according to the above fifth embodiment is applied.

FIG. 28 shows the structure of an optical fiber amplifier using the optical isolator 500 according to the fifth embodiment of the present invention.

The second output optical fiber 3 of the optical isolator 500 is connected to one terminal of the EDF 25, while the other terminal of the EDF 25 is connected to the first input optical fiber 1. To the first and second polarization-maintaining optical fibers 11 and 13 are connected the excitation light sources 27A and 27B so that the rays from the first and second polarization-maintaining optical fibers 11 and 13 match the rays from the excitation light sources 27a and 27B in plane of polarization.

In the optical amplifier thus constituted, if signal light made incident from the second input optical fiber 2 which is open, the amplified light signal is outputted from the first output optical fiber 4 which is open, thereby implementing a miniaturized optical fiber in accordance with the bidirectional excitation system at low cost.

We claim:

1. An optical isolator comprising:

a lens for converting incident light into collimated light;

a plurality of pairs of input optical fibers and output optical fibers provided on one end side of said lens;

a reflecting mirror provided on the other end side of said lens so as to reflect incident rays from said input optical fibers, which passed through said lens, to said output optical fibers which correspond individually to said input optical fibers;

a birefringent element provided between said lens and said input and output optical fibers so as to resolve light which passes therethrough into an ordinary ray and an extraordinary ray, which are linearly polarized rays at right angles to each other;

a compensator provided in the optical paths of the incident rays from said input optical fibers between said lens and said birefringent element or in the optical paths of the rays emitted to said output optical fibers so as to rotate 45 degrees the planes of polarization of the rays which pass therethrough; and a magneto-optical element provided between said lens and said reflecting mirror so as to rotate 22.5 degrees the planes of polarization of the rays which pass therethrough, said compensator and said magneto-optical element rotating the planes of polarization of the rays emitted from said input optical fibers in the same direction.

2. An optical isolator according to claim 1, wherein a connecting line segment between the input optical fiber and output optical fiber in one of said pairs and a connecting line segment between the input optical fiber and output optical fiber in the other of said pairs intersect each other at midpoints.

3. An optical isolator according to claim 1, further comprising three more optical fibers which are aligned on one end side of said lens, wherein said input optical fibers and output optical fibers are two pairs of input optical fibers and output optical fibers and said two pairs of input optical fibers and output optical fibers are arranged so that each input optical fiber and its corresponding optical fiber are diagonally positioned with said three optical fibers interposed therebetween and that said two pairs of input optical fibers and output optical fibers and said three optical fibers are stacked so as to form a hexagon in cross section.

4. An optical isolator according to claim 1, wherein the mode field diameter of each of the cores in those end portions of said input and output optical fibers which are closer to said lens is enlarged.

5. An optical isolator according to claim 1, wherein the output optical fiber in one of said pairs is optically connected to the input optical fiber in the other of said pairs.

6. An optical isolator according to claim 1, further comprising:

a polarization-maintaining optical fiber provided on one end side of said lens so as to receive an incident ray which has a wavelength different from the wavelengths of the incident rays from said input optical fibers; and a wavelength selecting filter provided between said lens and said magneto-optical element so as to transmit the incident rays from said input optical fibers, while reflecting the incident light from said polarization-maintaining optical fiber said input optical fiber or said output optical fiber.

7. An optical isolator according to claim 6, wherein said reflecting mirror transmits a part of the incident ray from one of said input optical fibers, said optical isolator further comprising a condenser lens for condensing the ray transmitted by said reflecting mirror and a photodetector for detecting the intensity of the ray condensed by said condenser lens.

8. An optical isolator according to claim 6, further comprising:

a first holder for integrally holding said input and output optical fibers, said polarization-maintaining optical fiber, said birefringent element, and said compensator;

a second holder for integrally holding said lens, said wavelength selecting filter, and said magneto-optical element; and a distance adjusting member for variably setting the distance between said first holder and said second holder.

9. An optical isolator according to claim 1, wherein said reflecting mirror transmits a part of the incident ray from one of said input optical fibers, said optical isolator further comprising a condenser lens for condensing the ray transmitted by said reflecting mirror and a photodetector for detecting the intensity of the ray condensed by said condenser lens.

10. An optical isolator according to claim 1, further comprising:

a first holding member which is provided so as to rotate around a first axis tilted with respect to the normal to said reflecting mirror and which securely holds said reflecting mirror; and a second holding member which is provided so as to rotate around a second axis coincident with the normal to said reflecting mirror and which holds said first holding member so that it can rotate in relation to said first axis.

11. An optical isolator according to claim 10, wherein each of said first holding member and second holding member is provided with a mark for indicating a relative positional relationship between said first holding member and second holding member in the circumferential direction when the normal to said reflecting mirror coincides with said second axis.

12. An optical isolator according to claim 10, wherein said first holding member has an outer circumferential surface which is circular in cross section and said second holding member has an insertion hole which is circular in cross section, said first holding member being rotatably inserted into the insertion hole of said second holding member, said first and second holding members having their respective contact portions which are in contact with each other in a plane at right angles to said first axis.

13. An optical isolator according to claim 10, wherein the optical center of said reflecting mirror is set at the intersection of said first axis and said second axis.

14. An optical isolator according to claim 10, wherein a relationship of $\beta 1>\beta 2$ is set between an angle $\beta 1$ which is formed between the optical axis of said lens and said first axis and arm angle $\beta 2$ which is formed between a plane at right angles to said first axis and the reflecting surface of said reflecting mirror.

15. An optical isolator according to claim 1, further comprising:

a first holding member which is provided so as to rotate around a first axis tilted with respect to the normal to said reflecting mirror and which securely holds said reflecting mirror; and a second holding member which is provided so as to rotate around a second axis tilted at an angle different from said first axis with respect to the normal to said reflecting mirror and which holds said first holding member so that it can rotate relation to said first axis.

16. An optical isolator according to claim 15, wherein said first holding member has an outer circumferential surface which is circular in cross section and said second holding member has an insertion hole which is circular in cross section, said first holding member being rotatably inserted into the insertion hole of said second holding member, said first and second holding members having their respective contact portions which are in contact with each other in a plane at right angles to said first axis.

17. An optical isolator according to claim 15, wherein the optical center of said reflecting mirror is set at the intersection of said first axis and said second axis.

18. An optical isolator according to claim 15, wherein a relationship of $\beta 1>\beta 2$ is set between an angle $\beta 1$ which is formed between the optical axis of said lens and said first axis and an angle $\beta 2$ which is formed between a plane at right angles to said first axis and the reflecting surface of said reflecting mirror.

19. An optical isolator according to claim 1, further comprising:

a first and second polarization-maintaining optical fibers provided on one end side of said lens so as to receive incident rays which have wavelengths different from the wavelengths of the incident rays from said input optical fibers;

a wavelength selecting filter provided between said lens and said magneto-optical element so as to transmit the incident rays from said input optical fibers, while reflecting the incident ray from said first polarization-maintaining optical fiber to one of said input optical fibers and reflecting the incident ray from said second polarization-maintaining optical fiber to one of said output optical fibers; and another compensator provided in the optical path of the incident ray from said second polarization-maintaining optical fiber between said birefringent element and said lens so as to rotate 45 degrees the planes of polarization of the rays which pass therethrough in the direction opposite to the direction in which said compensator rotates them.

20. An optical fiber amplifier comprising:

a lens for converting incident light into collimated light;

a plurality of pairs of input optical fibers and output optical fibers provided on one end side of said lens;

a reflecting mirror provided on the other end side of said lens so as to reflect incident rays from said input optical fibers, which passed through said lens, to said output optical fibers which correspond individually to said input optical fibers;

a birefringent element provided between said lens and said input and output optical fibers so as to resolve light which passes therethrough into an ordinary ray and an extraordinary ray, which are linearly polarized rays at right angles to each other;

a compensator provided in the optical paths of the incident rays from said input optical fibers between said lens and said birefringent element or in the optical paths of the rays emitted to said output optical fibers so as to rotate 45 degrees the planes of polarization of the rays which pass therethrough;

a magneto-optical element provided between said lens and said reflecting mirror so as to rotate 22.5 degrees the planes of polarization of the rays which pass therethrough;

an amplification optical fiber which has one terminal connected to the output optical fiber in one of said pairs and the other terminal connected to the input optical fiber in the other of said pairs via an optical multiplexer; and an excitation light source for outputting excitation light to said amplification optical fiber via said optical multiplexer, said compensator and said magneto-optical element rotating the planes of polarization of the rays emitted from said input optical fibers in the same direction.

21. An optical fiber amplifier according to claim 20, wherein said reflecting mirror transmits a part of the incident ray from said input optical fiber in the other pair, said optical fiber amplifier further comprising a condenser lens for condensing the amplified ray transmitted by said reflecting mirror, a photodetector for detecting the intensity of the amplified ray condensed by said condenser lens, and driving means for controlling, based on the intensity of the amplified ray detected by said photodetector, the output of excitation light outputted from said excitation light source.

22. An optical fiber amplifier comprising:

a lens for converting incident light into collimated light;

a plurality of pairs of input optical fibers and output optical fibers provided on one end side of said lens;

a polarization-maintaining optical fiber provided on one end side of said lens;

a reflecting mirror provided on the other end side of said lens so as to reflect incident rays from said input optical fibers, which passed through said lens, to said output optical fibers which correspond individually to said input optical fibers:

a birefringent element provided between said lens and said input and output optical fibers so as to resolve light which passes therethrough into an ordinary ray and an extraordinary ray, which are linearly polarized rays at right angles to each other;

a compensator provided in the optical paths of the incident rays from said input optical fibers between said lens and said birefringent element or in the optical paths of the rays emitted to said output optical fibers so as to rotate 45 degrees the planes of polarization of the rays which pass therethrough;

a magneto-optical element provided between said lens and said reflecting mirror so as to rotate 22.5 degrees the planes of polarization of the rays which pass therethrough;

an amplification optical fiber which has one terminal connected to the output optical fiber in one of said pairs and the other terminal connected to the input optical fiber in the other of said pairs:

an excitation light source for outputting excitation light to said polarization-maintaining optical fiber; and a wavelength selecting filter provided between said lens and said magneto-optical element, which transmits incident rays from said input optical fibers while reflecting the excitation light incident from said polarization-maintaining optical fiber the input optical fiber in the other of said pairs or to the output optical fiber in one of said pairs, said compensator and said magneto-optical element rotating the planes of polarization of the rays emitted from said input optical fibers in the same direction.

23. An optical fiber amplifier according to claim 22, wherein said reflecting mirror transmits a part of the amplified ray incident from the input optical fiber in said other pair, said optical fiber amplifier further comprising a condenser lens for condensing the amplified ray transmitted by said reflecting mirror, a photodetector for detecting the intensity of the amplified ray condensed by said condenser lens, and a driving means for controlling, based on the intensity of the amplified ray detected by said photodetector, the output of the excitation light outputted from said excitation light source.

24. An optical fiber amplifier comprising:

a lens for converting incident light into collimated light;

a plurality of pairs of input optical fibers and output optical fibers provided on one end side of said lens;

first and second polarization-maintaining optical fibers provided on one end side of said lens;

a reflecting mirror provided on the other end side of said lens so as to reflect incident rays from said input optical fibers, which passed through said lens, to said output optical fibers which correspond individually to said input optical fibers;

a birefringent element provided between said lens and said input and output optical fibers so as to resolve light which passes therethrough into an ordinary ray and an extraordinary ray, which are linearly polarized rays at right angles to each other;

a compensator provided in the optical paths of the incident rays from said input optical fibers between said lens and said birefringent element or in the optical paths of the rays emitted to said output optical fibers so as to rotate 45 degrees the planes of polarization of the rays which pass therethrough;

a magneto-optical element provided between said lens and said reflecting mirror so as to rotate 22.5 degrees the planes of polarization of the rays which pass therethrough;

an amplification optical fiber which has one terminal connected to the output optical fiber in one of said pairs and the other terminal connected to the input optical fiber in the other of said pairs;

an excitation light source for inputting excitation light said first and second polarization-maintaining optical fibers: and a wavelength selecting filter provided between said lens and said magneto-optical element, which transmits incident rays from said input optical fibers while reflecting the excitation light incident from said first polarization-maintaining optical fiber to the input optical fiber in the other of said pairs and reflecting the excitation light incident from said second polarization-maintaining optical fiber to the output optical fiber in one of said pairs, said compensator and said magneto-optical element rotating the planes of polarization of the rays emitted from said input optical fibers in the same direction.

25. An optical fiber amplifier according to claim 24, wherein said reflecting mirror transmits a part of the amplified ray incident from the input optical fiber in said other pair, said optical fiber amplifier further comprising a condenser lens for condensing the amplified ray transmitted by said reflecting mirror, a photodetector for detecting the intensity of the amplified ray condensed by said condenser lens, and a driving means for controlling, based on the intensity of the amplified ray detected by said photodetector, the output of the excitation light outputted from said excitation light source.

* * * * *

UNITED STATES PATENT AND TRADEMARK OFFICE
CERTIFICATE OF CORRECTION

PATENT NO. : 5,493,440
DATED : February 20, 1996
INVENTOR(S) : Souda, et. al.

It is certified that error appears in the above-identified patent and that said Letters Patent is hereby corrected as shown below:

Column 1, line 58; change "imparted" to --imparted to--.

Column 2, line 31; change "rays" to --rays in--; and
    line 51; change "fir ore" to --from--.

Column 3, line 2, change "tile" to --the--;
    line 31; change "fiber" to --fiber in--; and
    line 59, change "from" to --from an--.

Column 4, line 10, change "pall" to --pair--;
    line 12, change "fiber" to --fiber in--; and
    line 35, change "right" to --light--.

Column 5, line 23, change "around" to --around a --;
    line 27, change "if" to --if the--; and
    line 47, change "hole" to --hole of--.

Column 10, line 16, change "if" to --a--; and
    line 40, change "principle" to --principle of--.

UNITED STATES PATENT AND TRADEMARK OFFICE
CERTIFICATE OF CORRECTION

PATENT NO. : 5,493,440
DATED : February 20, 1996
INVENTOR(S) : Souda, et. al.

It is certified that error appears in the above-identified patent and that said Letters Patent is hereby corrected as shown below:

Column 11, line 34, change "FIGS." to --In FIGS.--;
  line 57, change "8." to --3.--; and
  line 66, change "futile" to --rutile--.

Column 12, line 4, change "or" to --or at--.

Column 13, line 22, change "arm" to --an--.

Column 14, line 60, change "8" to --3--.

Column 16, line 3, change "tile" to --the--.

Column 17, line 7, change "tile" to --the--.

Column 18, line 14, change "18." to --13.--;
  line 16, change "$80_2$" to --$\lambda_2$--;
  line 23, change "arid" to --and--; and
  line 27, change "8," to --3,--.

Column 19, line 21, change "8," to --3,--; and
  line 29, change "8." to --3.--.

Column 20, line 4, change "tens" to --lens--; and
  line 15, change "exciter:ion" to --excitation--.

UNITED STATES PATENT AND TRADEMARK OFFICE
CERTIFICATE OF CORRECTION

PATENT NO. : 5,493,440
DATED : February 20, 1996
INVENTOR(S) : Souda, et. al.

It is certified that error appears in the above-identified patent and that said Letters Patent is hereby corrected as shown below:

Column 21, line 14, change "ankle" to --angle--;
       line 20, change "$r=[\{(X_1+X_2\}^2+\{(Y_1+Y_2)/2\}^2\}]^{1/2}$" should read --$r=[\{(X_1+X_2)/2\}^2+\{(Y_1+Y_2)/2\}^2]^{1/2}$--;
       line 30, change "Z=5.8 mm," to --Z=5.3 mm--;
       line 31, change "θ the" to --θ of the--; and
       line 35, change "angle" to --angle of--.

Column 22, line 31, change "4SA" to --45A--;
       line 40, change "tile" to --the--;
       line 43, change "each" to --each of;
       line 50, change "FIG." to --In FIG.--; and
       line 53, change "tile" to --the--.

Column 23, line 32, change "FIG." to --In FIG.--;
       line 39, change "$O_l$" to --$O_L$--; and
       line 64, change "ankle" to --angle--.

Column 24, line 6, change "8" to --24--; and
       line 61, change "isolators" to --isolators in--.

UNITED STATES PATENT AND TRADEMARK OFFICE
CERTIFICATE OF CORRECTION

PATENT NO. : 5,493,440
DATED : February 20, 1996
INVENTOR(S) : Souda, et. al.

It is certified that error appears in the above-identified patent and that said Letters Patent is hereby corrected as shown below:

Claim 6, line 11, change "fiber" to --fiber to--.  (1st occurrence)

Claim 14, line 4 change "and arm" to --and an--.

Claim 15, line 11 change "rotate" to --rotate in--.

Claim 24, line 5, change "first" to --a first--; and
        line 31, change "light" to --light to--.  (2nd occurrence)

Signed and Sealed this

Thirtieth Day of May, 2000

Attest:

Q. TODD DICKINSON

*Attesting Officer*          *Director of Patents and Trademarks*